US012806639B2

(12) United States Patent
Tanimoto et al.

(10) Patent No.: US 12,806,639 B2
(45) Date of Patent: Nov. 24, 2026

(54) MIST BLOWER AND MANUFACTURING METHOD OF LIQUID NOZZLE

(71) Applicant: MAKITA CORPORATION, Anjo (JP)

(72) Inventors: Natsuki Tanimoto, Anjo (JP); Tomoyuki Kutsuna, Anjo (JP); Yuki Koide, Anjo (JP); Ryoji Zama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 232 days.

(21) Appl. No.: 18/529,585

(22) Filed: Dec. 5, 2023

(65) Prior Publication Data

US 2024/0181479 A1 Jun. 6, 2024

(30) Foreign Application Priority Data

Dec. 6, 2022 (JP) ................................. 2022-194762

(51) Int. Cl.
*B05B 7/24* (2006.01)

(52) U.S. Cl.
CPC .......... *B05B 7/2424* (2013.01); *B05B 7/2408* (2013.01)

(58) Field of Classification Search
CPC ............................ B05B 7/2424; B05B 7/2408
USPC .... 239/423, 424, 424.5, 425, 426, 429, 432, 239/433, 434
See application file for complete search history.

(56) References Cited

U.S. PATENT DOCUMENTS

2004/0123991 A1* 7/2004 Hanratty ................ A62C 31/12
169/44
2010/0224377 A1 9/2010 Kikkawa et al.
2022/0008587 A1 1/2022 Ono

FOREIGN PATENT DOCUMENTS

EP 2 586 303 A1 5/2013
JP 2013-091023 A 5/2013
JP 2022-17092 A 1/2022
WO 2009/153847 A1 12/2009

OTHER PUBLICATIONS

Communication dated Jul. 14, 2026, issued in Japanese Application No. 2022-194762.

* cited by examiner

*Primary Examiner* — Christopher S Kim
(74) *Attorney, Agent, or Firm* — Sughrue Mion, PLLC

(57) ABSTRACT

A mist blower may include: a liquid tank configured to store liquid; a fan; an ejection tube through which air delivered by the fan flows; a liquid nozzle body disposed inside the ejection tube and configured to inject the liquid stored in the liquid tank into the ejection tube; and a facing body being away from the liquid nozzle body. The liquid nozzle body may comprise: a liquid passage through which the liquid flows and which comprises a constricted part having a minimum diameter; and a nozzle side surface along which air delivered by the fan flows. The liquid may be ejected from an ejection hole of the constricted part. The facing body may comprise: a facing surface that faces the ejection hole; and a facing body side surface connected to the facing surface and along which air delivered by the fan flows.

7 Claims, 18 Drawing Sheets

MIST BLOWER AND MANUFACTURING METHOD OF LIQUID NOZZLE

REFERENCE TO RELATED APPLICATIONS

This application claims priority to Japanese Patent Application No. 2022-194762, filed on Dec. 6, 2022, the entire contents of which are hereby incorporated by reference into the present application.

TECHNICAL FIELD

The disclosure herein relates to a mist blower and a manufacturing method of a liquid nozzle.

BACKGROUND ART

Japanese Patent Application Publication No. 2013-91023 describes a mist blower. The mist blower includes a liquid tank that stores liquid, a fan, an ejection tube through which air delivered by the fan flows, and a liquid nozzle that is disposed inside the ejection tube and introduces the liquid stored in the liquid tank into the ejection tube. The liquid nozzle includes an ejection hole through which the liquid is ejected outside the liquid nozzle.

DESCRIPTION

In the mist blower described above, the liquid ejected from the ejection hole usually flows on a front end surface to a corner part of the liquid nozzle, then separates off of the liquid nozzle at the corner part and is atomized. On the other hand, a part of the liquid ejected from the ejection hole does not flow on the front end surface toward the corner part, but rather separates off of the front end surface immediately after the ejection and is atomized. A particle size of the liquid that separated off of the front end surface near the ejection hole is larger than a particle size of the liquid atomized at the corner part of the liquid nozzle. The disclosure herein provides an art that enables atomization of liquid.

A mist blower disclosed herein may comprise: a liquid tank configured to store liquid; a fan; an ejection tube through which air delivered by the fan flows; a liquid nozzle body disposed inside the ejection tube and configured to inject the liquid stored in the liquid tank into the ejection tube; and a facing body being away from the liquid nozzle body. The liquid nozzle body may comprise: a liquid passage through which the liquid flows and which comprises a constricted part having a minimum diameter; and a nozzle side surface along which air delivered by the fan flows. The liquid may be ejected from an ejection hole of the constricted part. The facing body may comprise: a facing surface that faces the ejection hole; and a facing body side surface connected to the facing surface and along which air delivered by the fan flows.

According to the above configuration, the liquid ejected from the ejection hole collides on the facing surface of the facing body and flows on the facing surface to the facing body side surface. The liquid then separates off of the facing body by the air delivered by the fan. Consequently, the liquid can be atomized.

A manufacturing method of a liquid nozzle is disclosed herein. The liquid nozzle may be configured to introduce liquid stored in a liquid tank into an ejection tube through which air flows. The liquid nozzle may comprise: a base body including a penetrating aperture which extends in a first direction and through which the liquid flows; and a press-in body configured to be press-fitted in the base body. The penetrating aperture may comprise: a constricted part having a minimum diameter in the penetrating aperture; a first aperture part having a diameter greater than the diameter of the constricted part; and a second aperture part disposed opposite to the first aperture part with respect to the constricted part and having a diameter greater than the diameter of the constricted part. The manufacturing method may comprise: press-fitting the press-in body into the second aperture part to a position that is a predetermined distance away from the constricted part; and after the press-fitting, cutting the base body in a second direction perpendicular to the first direction at a position between the constricted part and the press-in body to define an opening penetrating the base body from a side surface of the base body to an inner surface of the base body.

In the liquid nozzle manufactured by the above method, the liquid ejected from the constricted part collides on the press-in body and flows on the press-in body toward the opening. The liquid then flows out of the liquid nozzle through the opening. The liquid separates off of the liquid nozzle by the air flowing around the liquid nozzle. Consequently, the liquid can be atomized.

Figure 6:
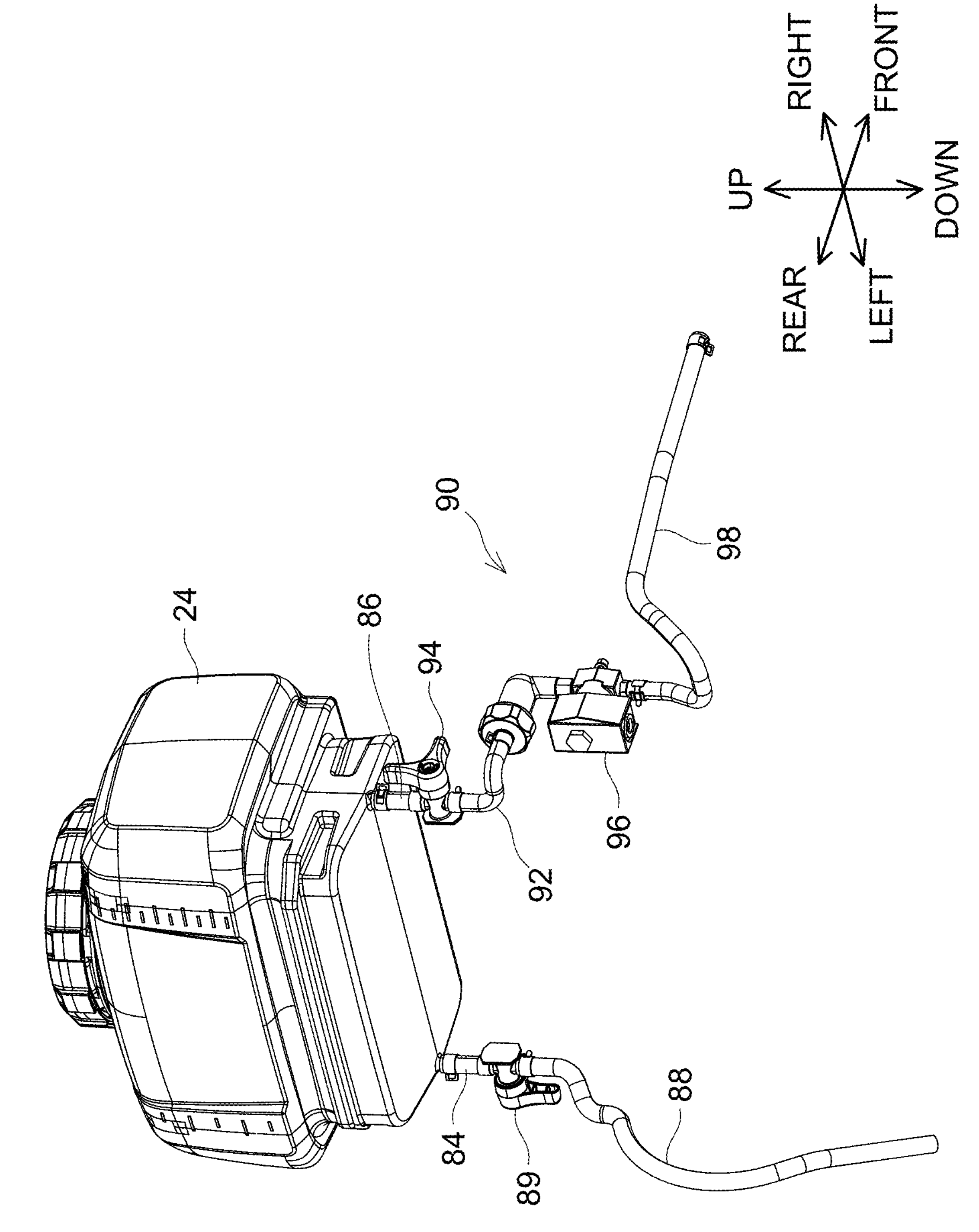

FIG. 6 shows a perspective view of a liquid tank 24, a discharge tube 88, and a supply line 90 of the first embodiment.

Figure 7:
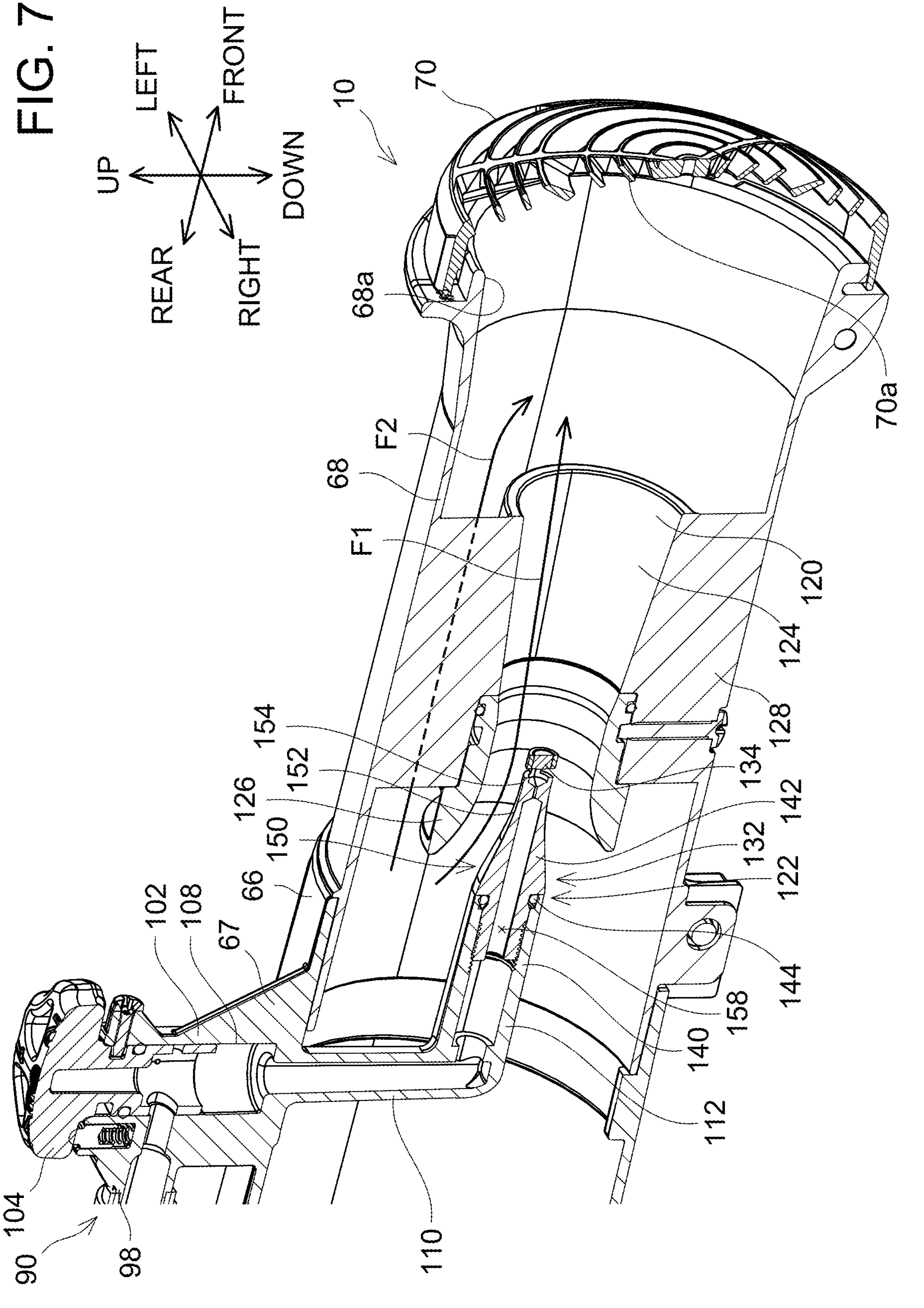

FIG. 7 shows a cross-sectional perspective view of the ejection tube 10, a tubular member 120, and a liquid nozzle 122 of the first embodiment.

Figure 8:
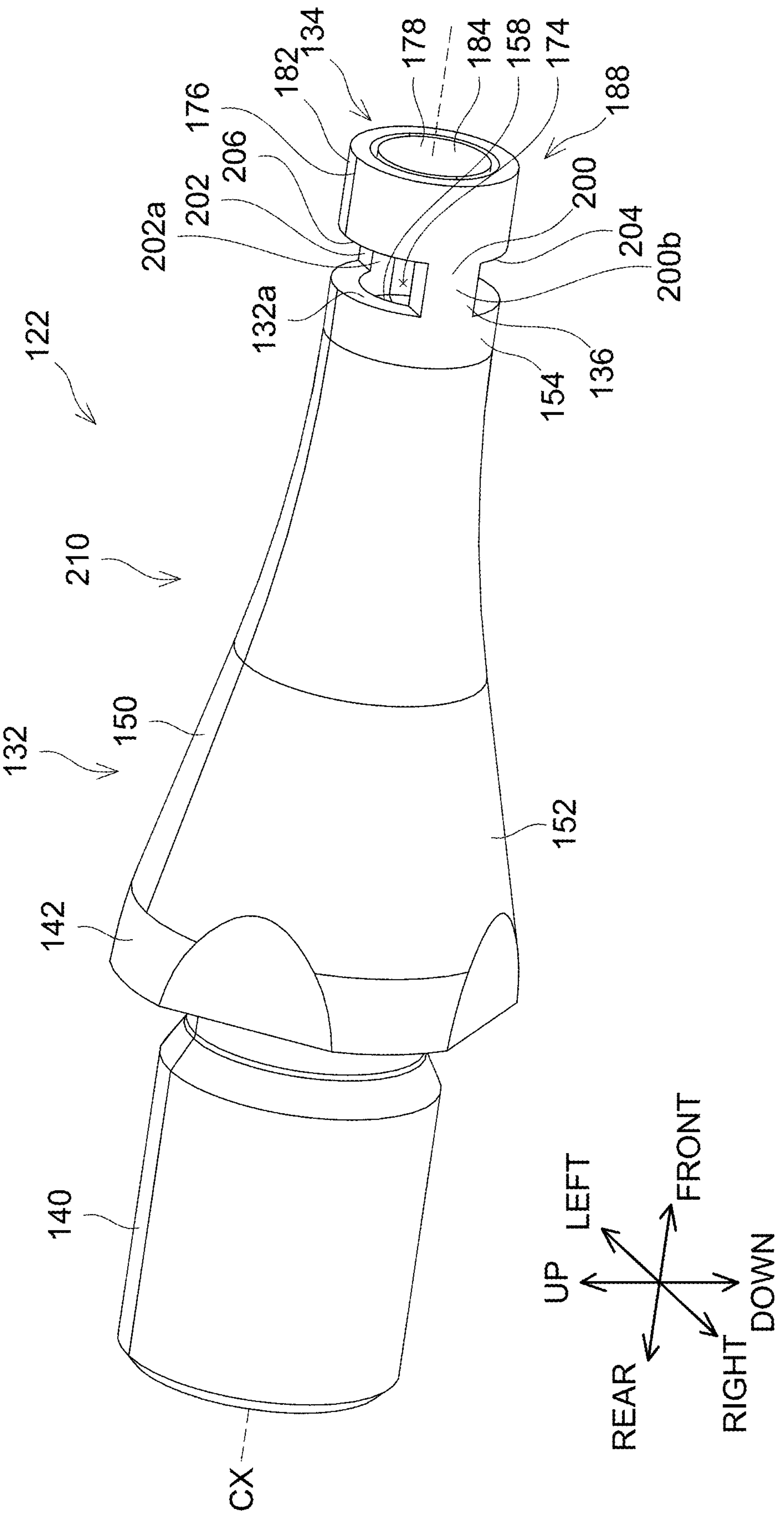

FIG. 8 shows a perspective view of the liquid nozzle 122 of the first embodiment.

Figure 9:
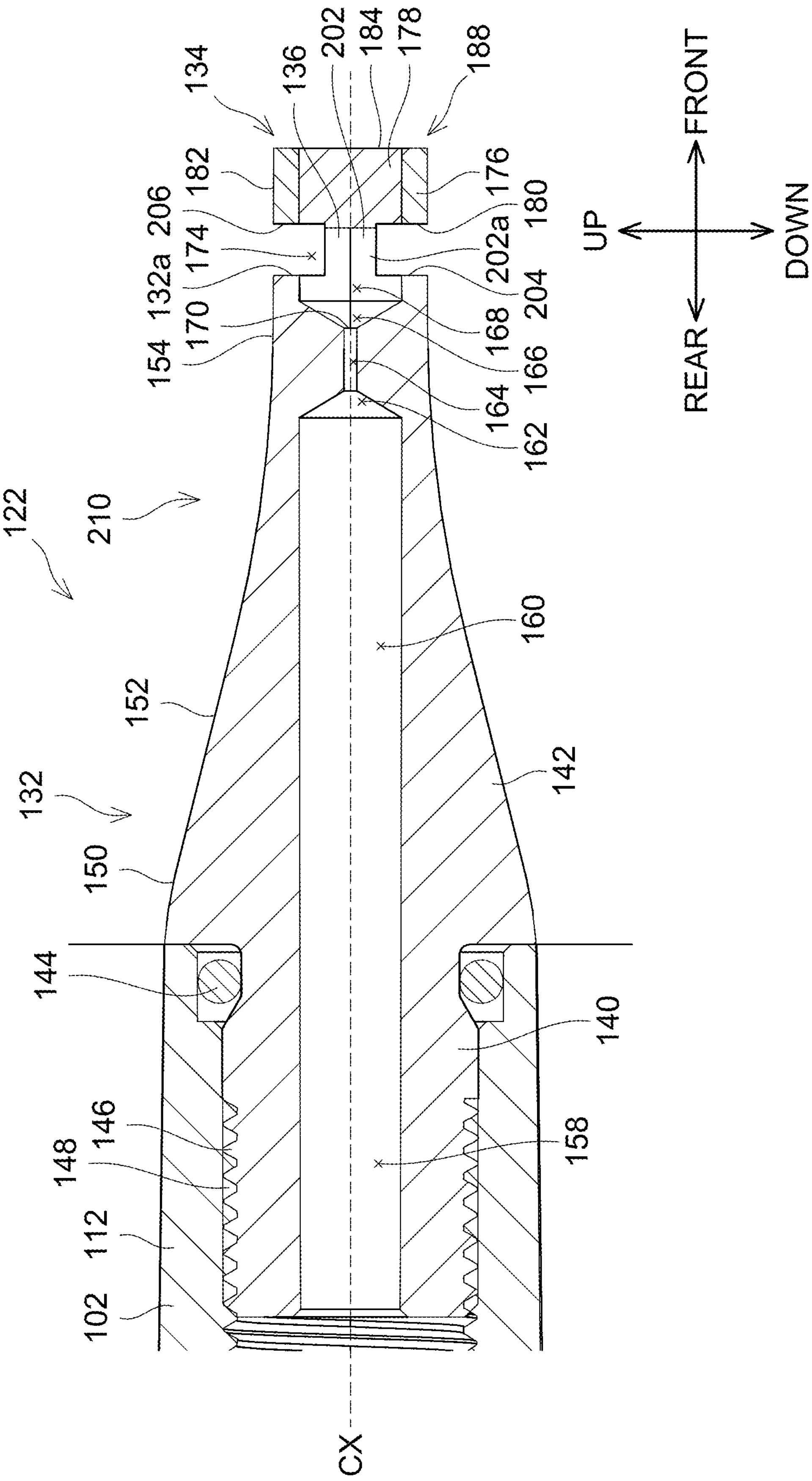

FIG. 9 shows a cross-sectional view of a second supply tube 102 and the liquid nozzle 122 of the first embodiment.

Figure 10:
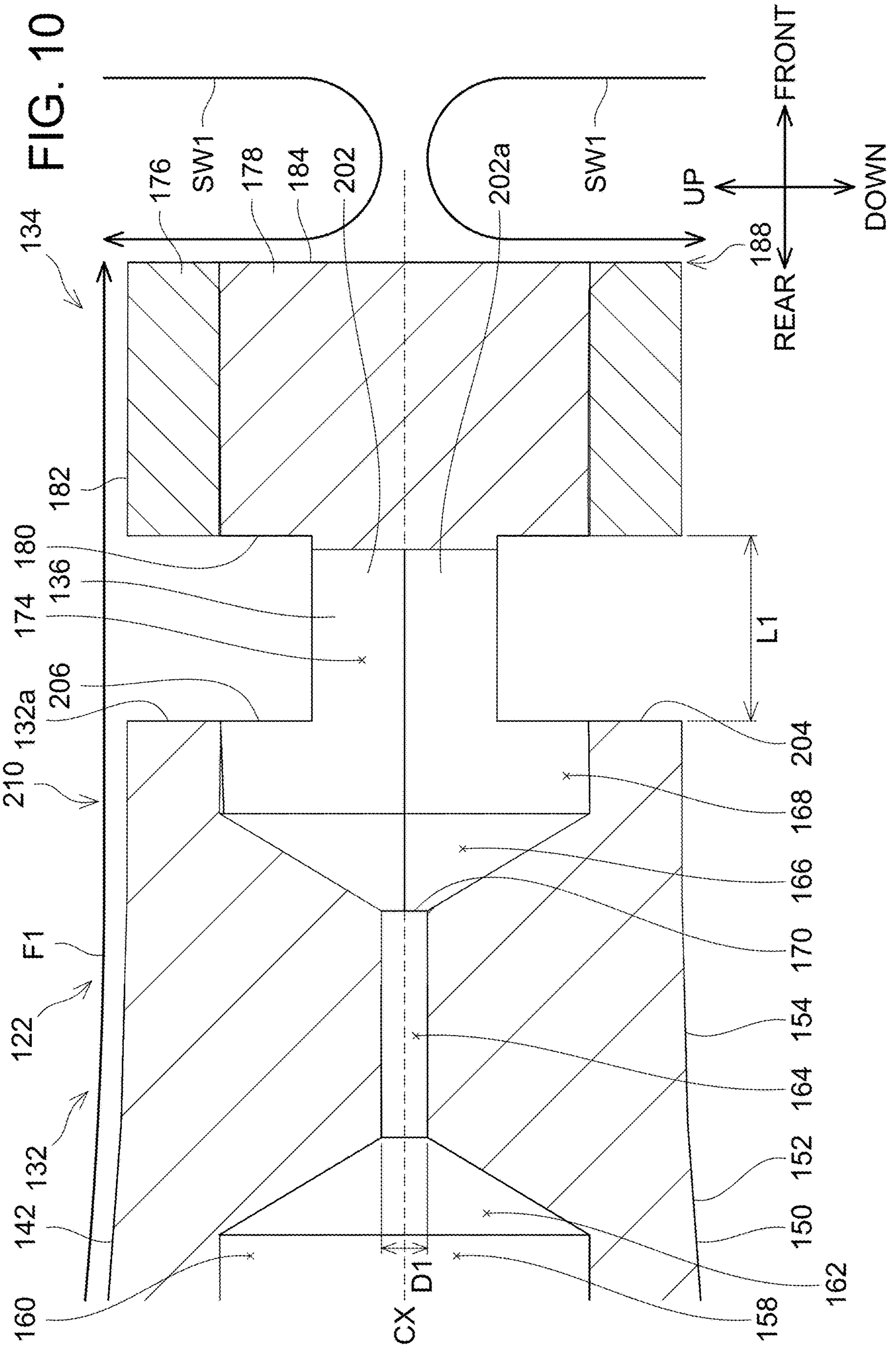

FIG. 10 shows a cross-sectional view of the front end of the liquid nozzle 122 of the first embodiment and its vicinity.

Figure 11:
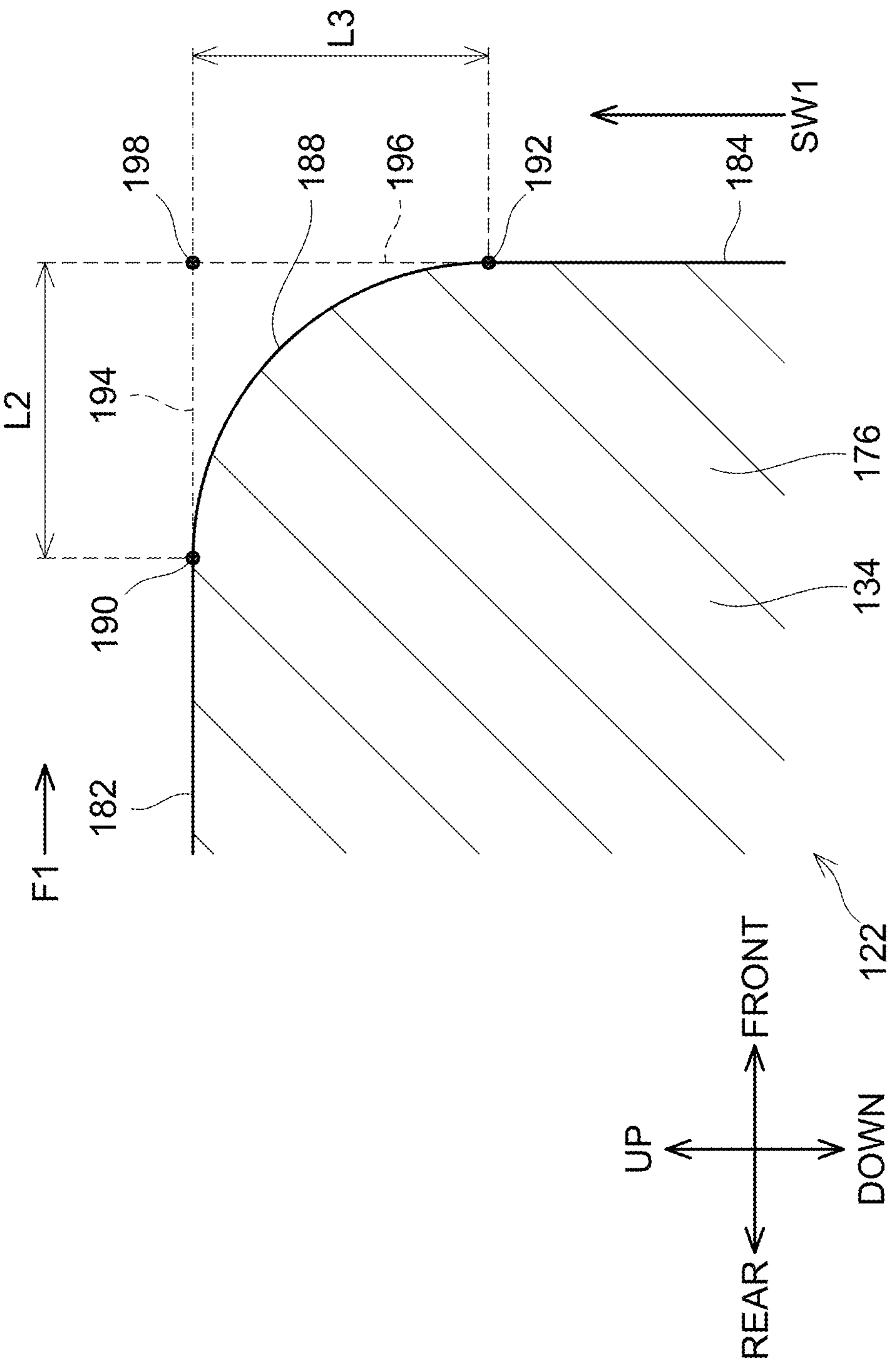

FIG. 11 shows a cross-sectional view of a corner part 188 of the liquid nozzle 122 of the first embodiment.

Figure 12:
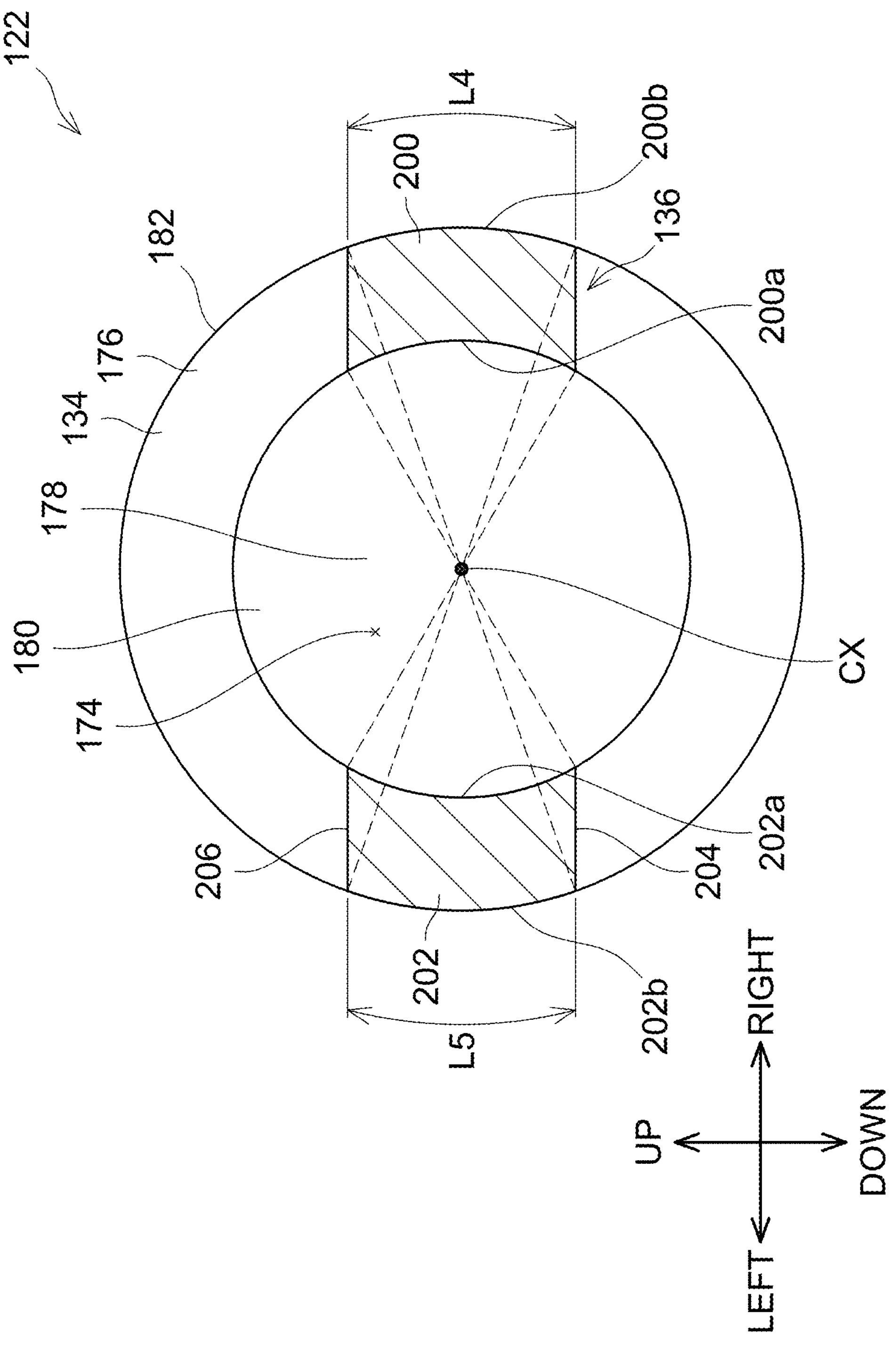

FIG. 12 shows a cross-sectional view of a connecting body 136 of the liquid nozzle 122 of the first embodiment and its vicinity.

Figure 13:
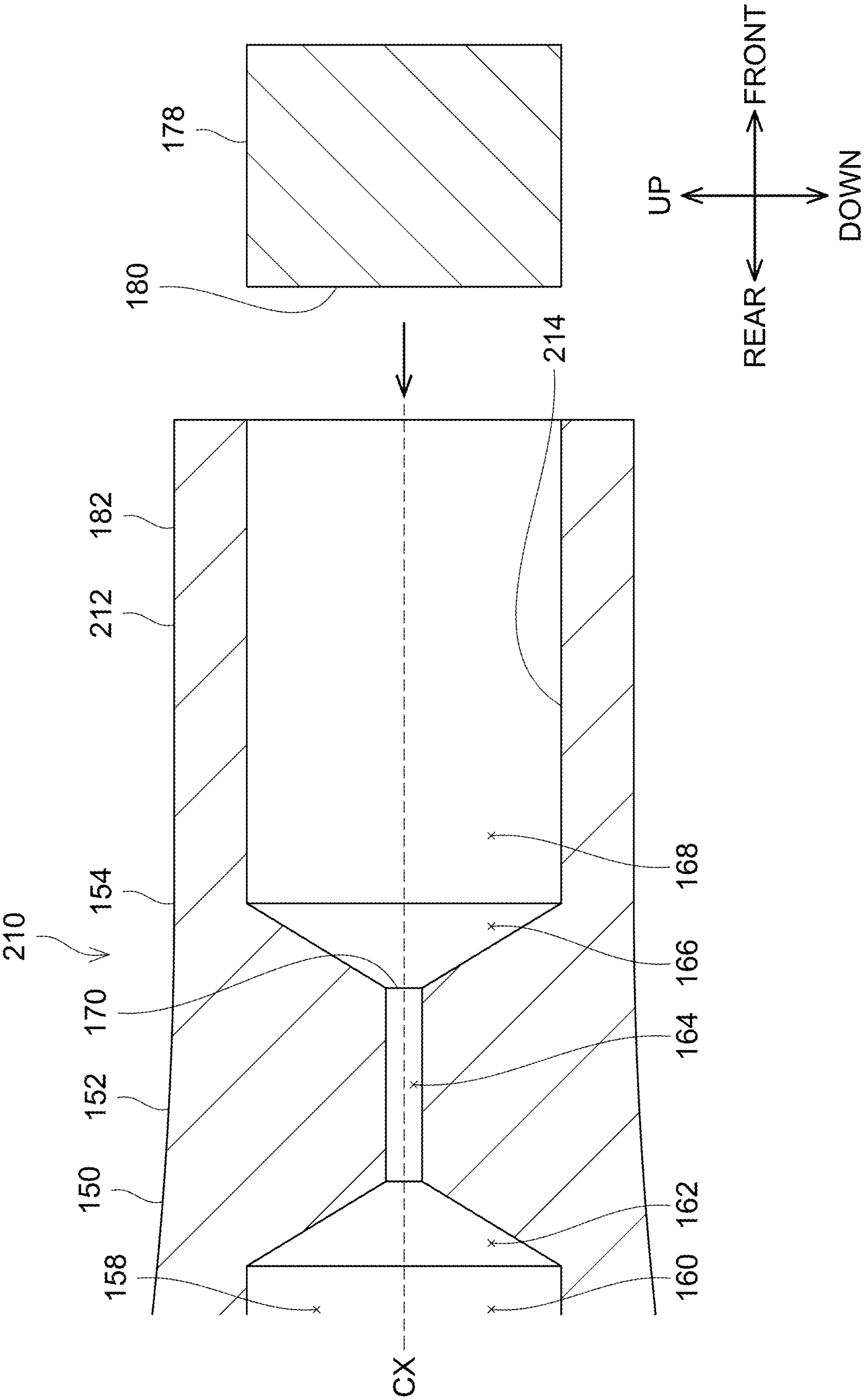

FIG. 13 is a cross-sectional view of the liquid nozzle 122, illustrating a manufacturing method of the liquid nozzle 122 of the first embodiment.

Figure 14:
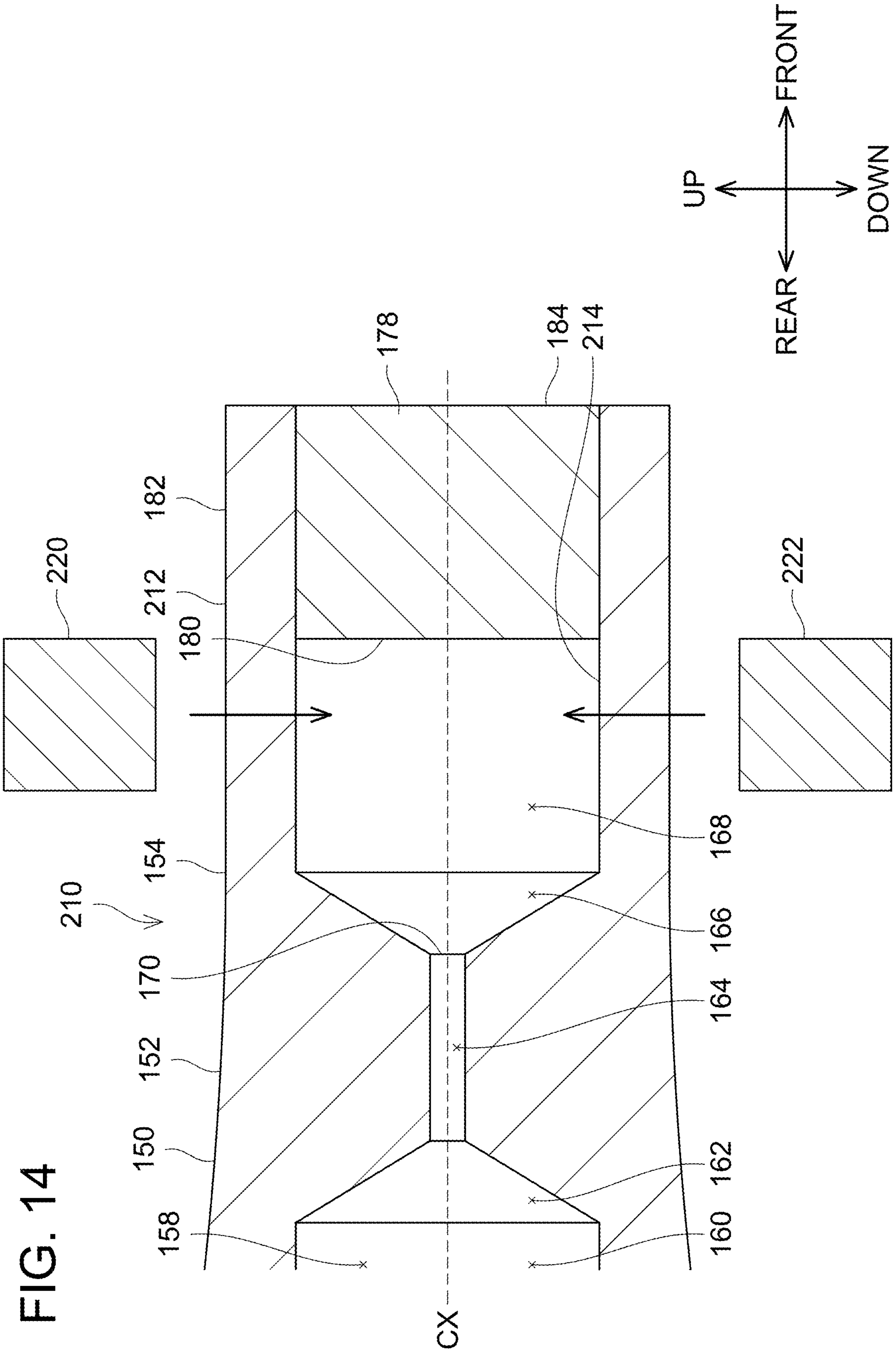

FIG. 14 is a cross-sectional view of the liquid nozzle 122, illustrating the manufacturing method of the liquid nozzle 122 of the first embodiment.

Figure 15:
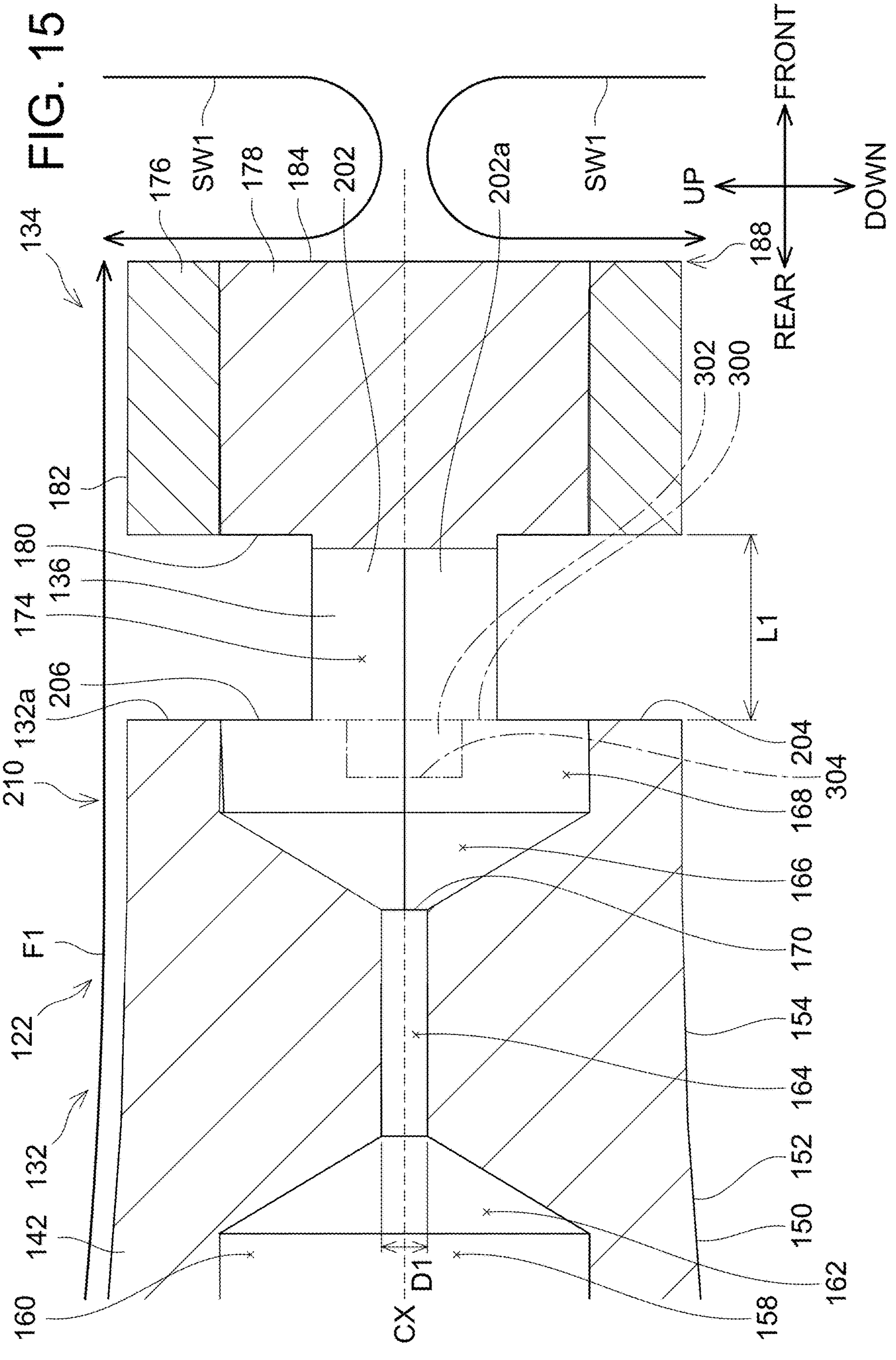

FIG. 15 shows a cross-sectional view of the front end of the liquid nozzle 122 of a second embodiment and its vicinity.

Figure 16:
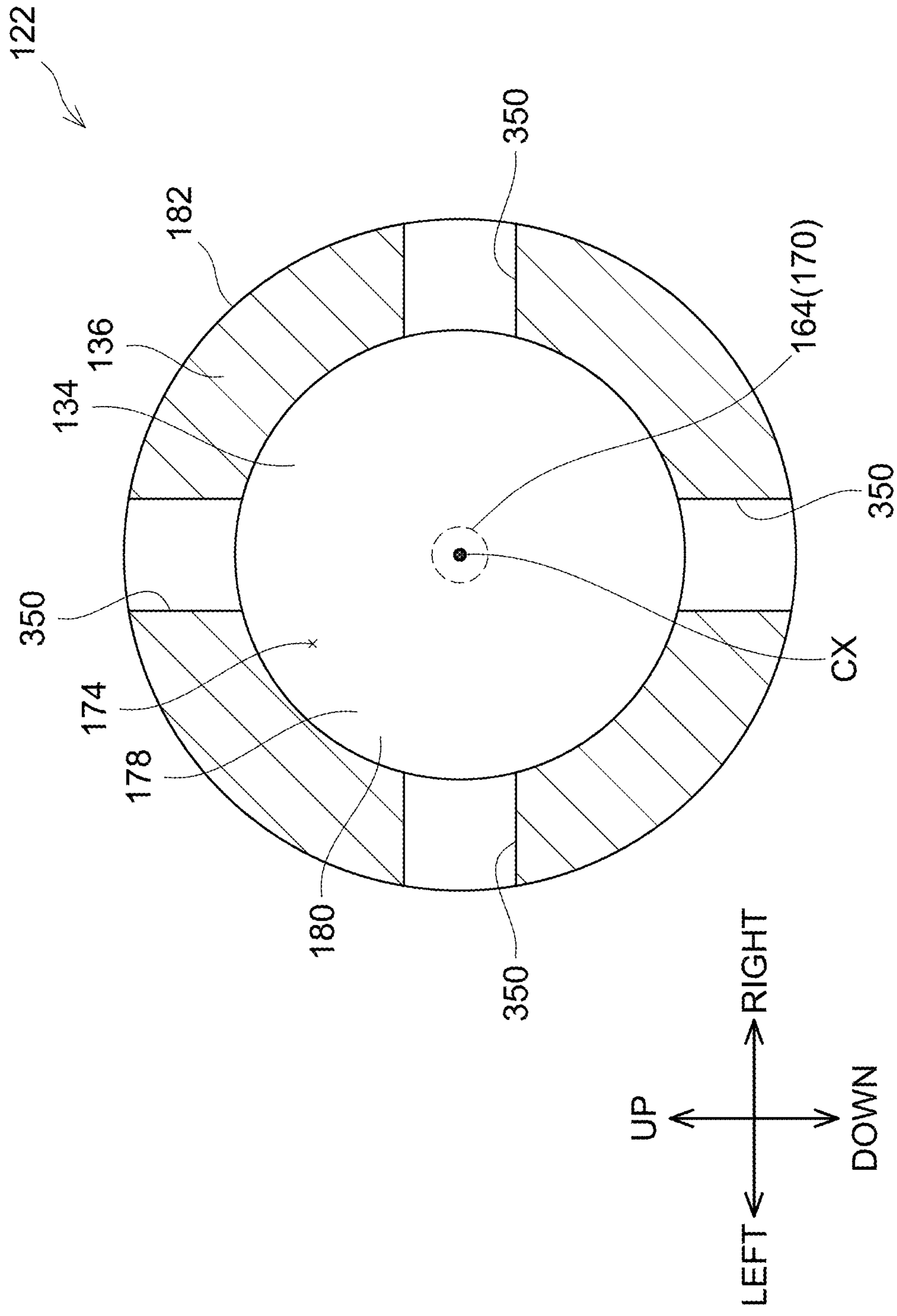

FIG. 16 shows a cross-sectional view of the connecting body 136 of the liquid nozzle 122 of a third embodiment and its vicinity.

Figure 17:
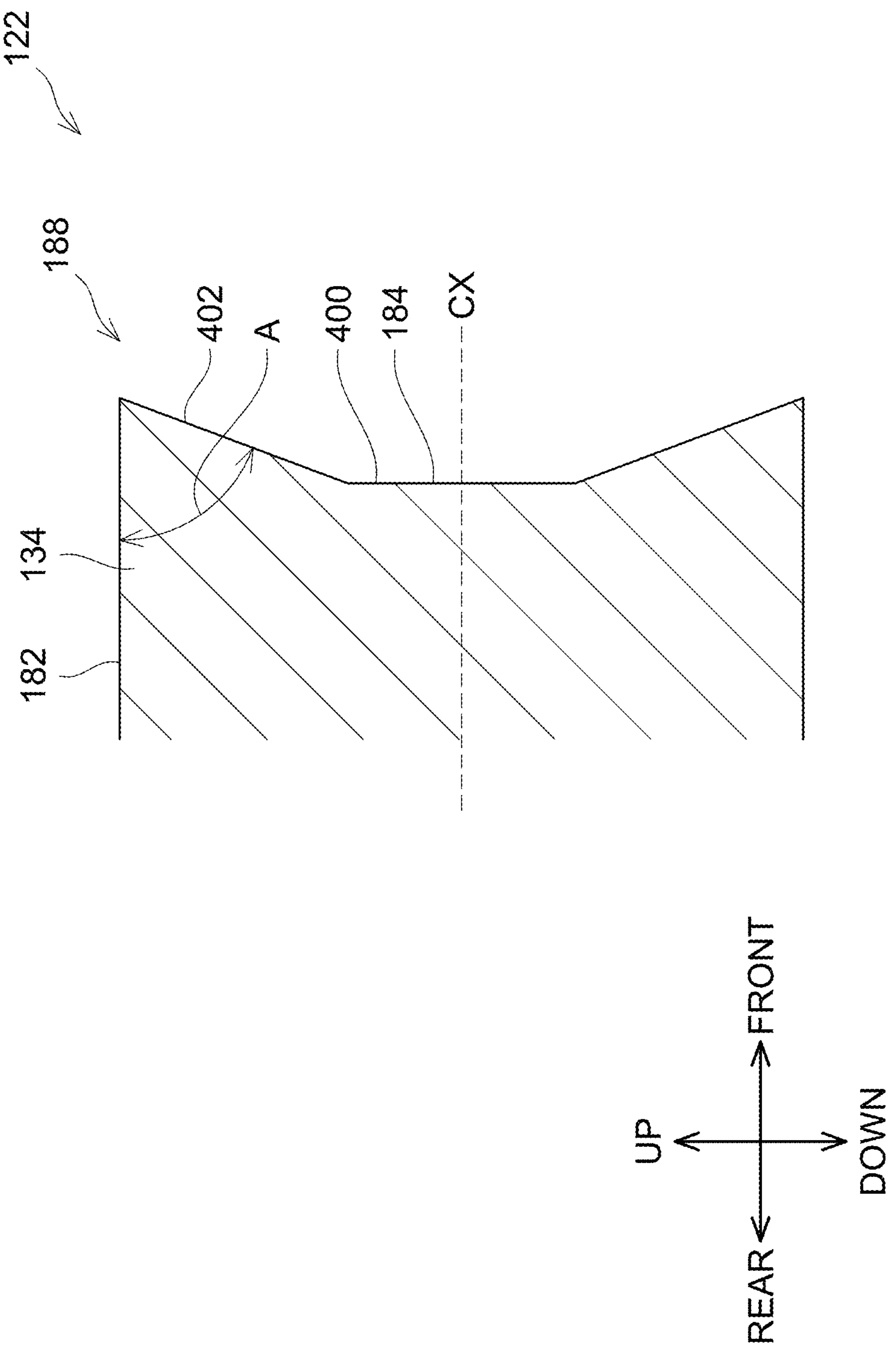

FIG. 17 shows a cross-sectional view of a facing body front end surface 184 of the facing body 134 of a fourth embodiment and its vicinity.

Figure 18:
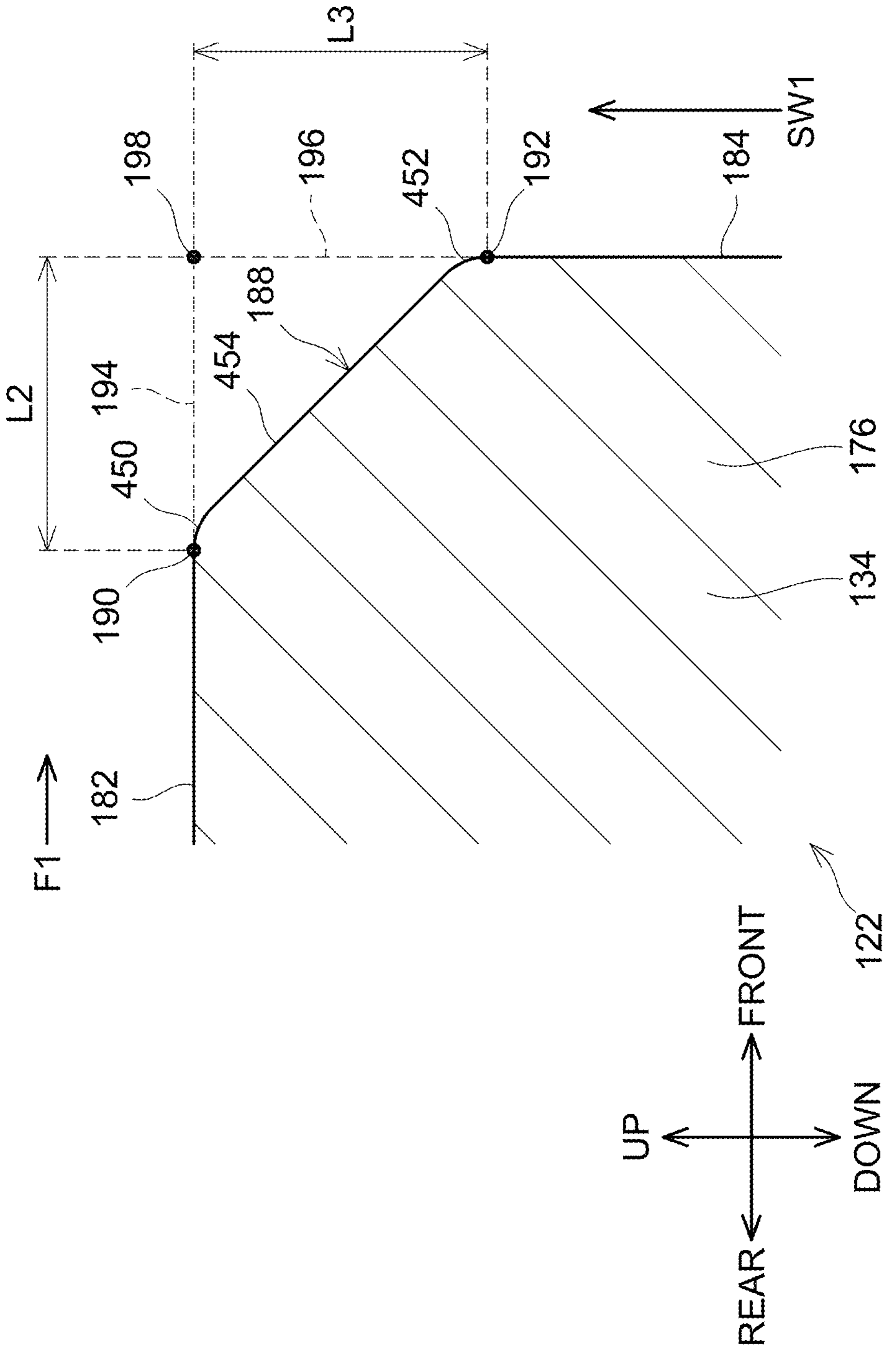

FIG. 18 shows a cross-sectional view of the corner part 188 of the liquid nozzle 122 of a fifth embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved mist blowers and liquid nozzles, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the nozzle side surface may have a circular shape having a first diameter. The facing body side surface may have a circular shape having a second diameter. The second diameter may be equal to or more than 60% of the first diameter and equal to or less than 100% of the first diameter.

According to the above configuration, even when air flows along the nozzle side surface of the liquid nozzle body and then flows along the facing body side surface of the facing body, decrease in an airflow speed can be suppressed. Consequently, the liquid can be atomized into finer particles.

In one or more embodiments, the mist blower may further comprise a connecting body that connects the liquid nozzle body and the facing body.

According to the above configuration, the position of the facing body with respect to the liquid nozzle body can be fixed. Accordingly, the liquid can be atomized in a stable manner.

In one or more embodiments, with respect to a circumferential direction of the facing body side surface, a length of an outer surface of the connecting body may be equal to or less than 50% of a length of the facing body side surface.

The above configuration allows the liquid to flow over the entire circumference of the facing body side surface. Consequently, the liquid can be atomized into finer particles.

In one or more embodiments, the connecting body may be integrated with the facing body and is a separate member from the liquid nozzle body.

According to the above configuration, the liquid nozzle body, the facing body, and the connecting body can easily be manufactured.

In one or more embodiments, a distance between the facing surface and the liquid nozzle body may be equal to or more than 200% of the diameter of the constricted part and equal to or less than 600% of the diameter of the constricted part.

When the distance between the facing surface and the liquid nozzle body is smaller than 200% of the diameter of the constricted part, the liquid ejected from the ejection hole accumulates between the liquid nozzle body and the facing body, by which atomization of the liquid is inhibited. On the other hand, when the distance between the facing surface and the liquid nozzle body is more than 600% of the diameter of the constricted part, an airflow speed of the air flowing along the facing body side surface of the facing body is decreased as compared to a configuration in which the distance between the facing surface and the liquid nozzle body is equal to or less than 600% of the diameter of the constricted part. As a result, atomization of the liquid is inhibited. According to the above configuration as disclosed herein, the liquid can be atomized.

First Embodiment

Figure 1:
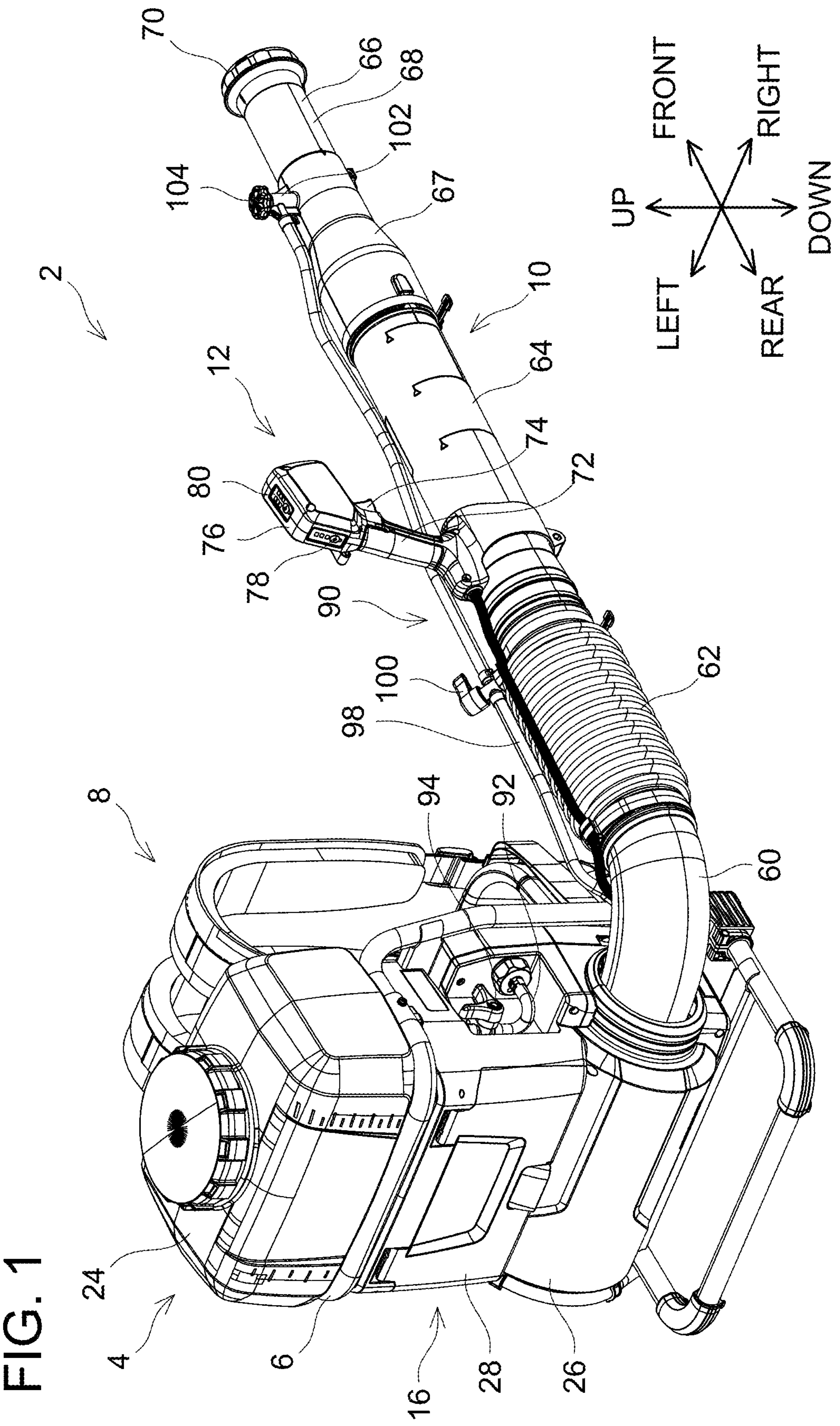
FIG. 1 shows a perspective view of a working machine 2 of a first embodiment.

As shown in FIG. 1, a working machine 2 is a backpack working machine. The working machine 2 is configured to eject (spray) liquid. The working machine 2 is, for example, a mist blower. The working machine 2 includes a body unit 4, a frame unit 6, a harness unit 8, an ejection tube 10, and a handle unit 12. The frame unit 6 is attached to the body unit 4. The harness unit 8 is attached directly and/or indirectly to the body unit 4. The ejection tube 10 is attached to a lower right portion of the body unit 4. The handle unit 12 is attached to the ejection tube 10. A user sprays the liquid from the ejection tube 10 by holding the handle unit 12 and handling the ejection tube 10 with the user wearing the harness unit 8 and carrying the working machine 2 on his/her back. In the following, a vertical direction, a front-rear direction, and a left-right direction of the working machine 2 respectively correspond to a vertical direction, a front-rear direction, and a left-right direction as viewed from the user carrying the working machine 2 on his/her back.

Figure 2:
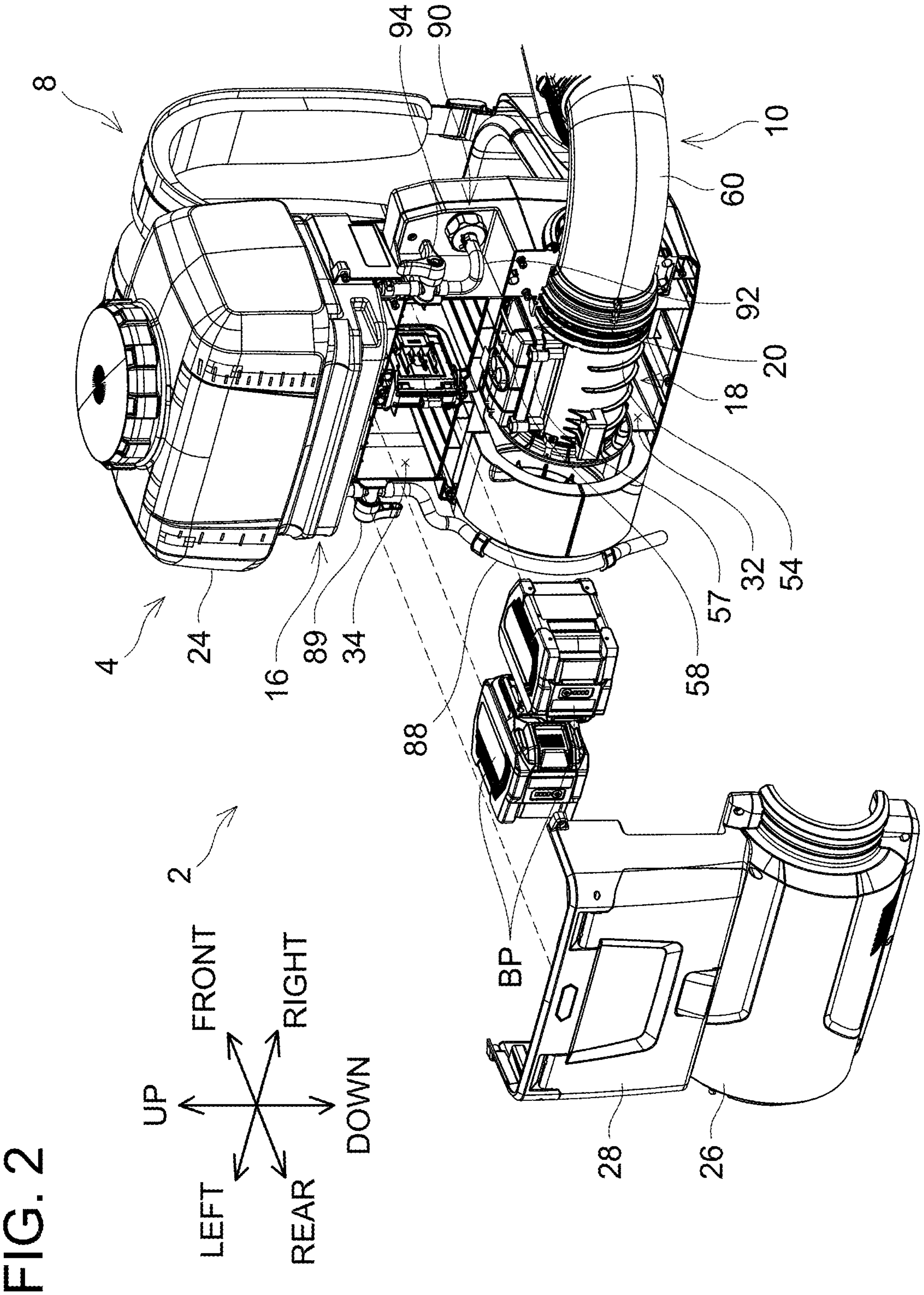
FIG. 2 shows an exploded perspective view of the working machine 2 of the first embodiment.
Figure 3:
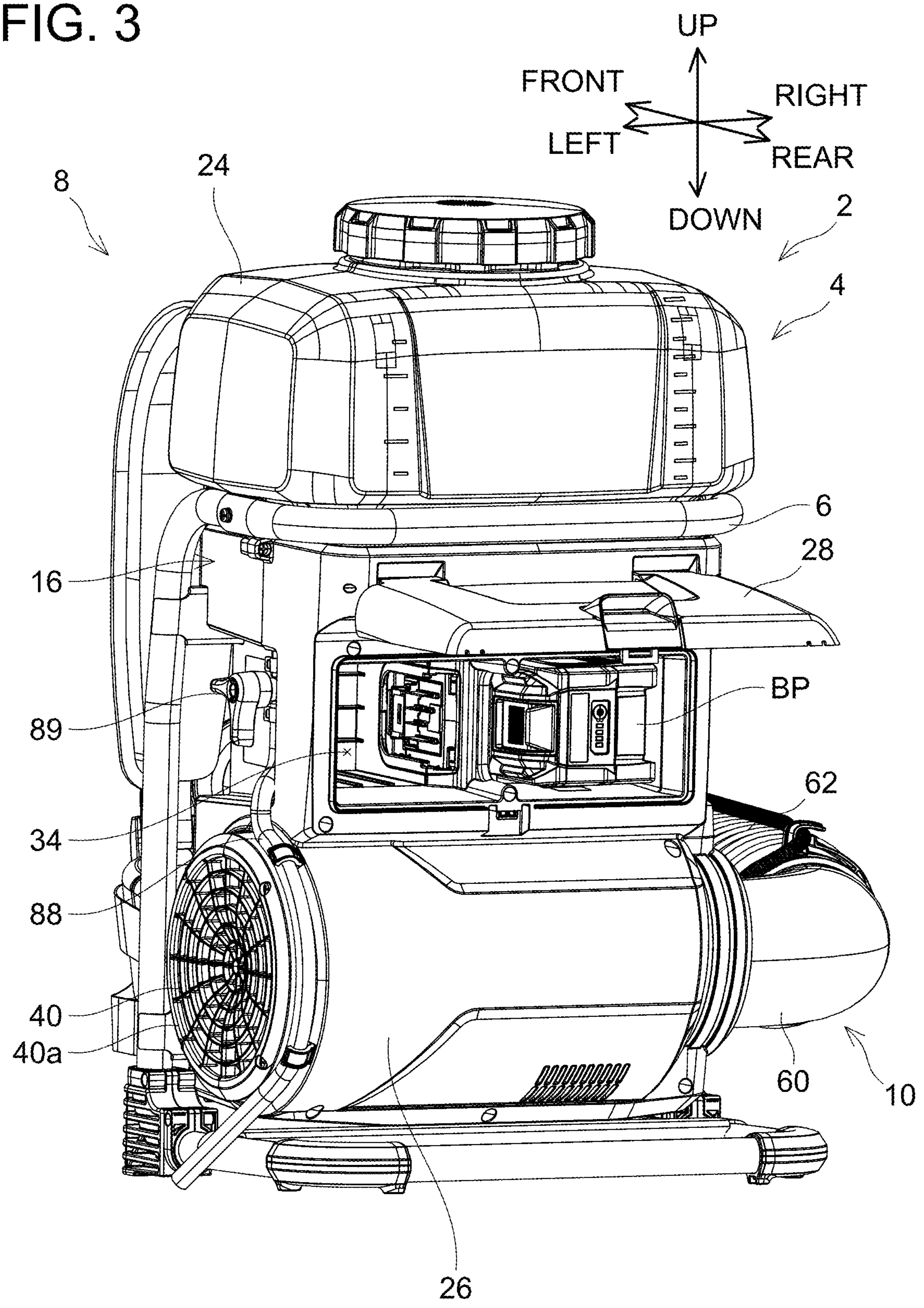
FIG. 3 shows a perspective view of the working machine 2 of the first embodiment when a cover part 28 is open.

As shown in FIG. 2, the body unit 4 includes a body housing 16, a fan unit 18, a control unit 20, and a liquid tank 24. As shown in FIG. 3, the body housing 16 includes a body part 26 and a cover part 28. The cover part 28 is attached to the body part 26 such that it is pivotable about a pivot axis extending in the left-right direction.

As shown in FIG. 2, a first internal space 32 and a second internal space 34 are defined inside the body part 26. In the first internal space 32, the fan unit 18 and the control unit 20 are arranged. As shown in FIG. 3, a cover 40 is attached near a lower portion of the left side surface of the body part 26, and the first internal space 32 is in communication with the outside of the working machine 2 through intake openings 40*a* of the cover 40. The second internal space 34 is in communication with the outside of the working machine 2 when the cover part 28 is opened. As shown in FIG. 2, a plurality of battery packs BP (two in the present embodiment) is arranged in the second internal space 34.

Figure 4:
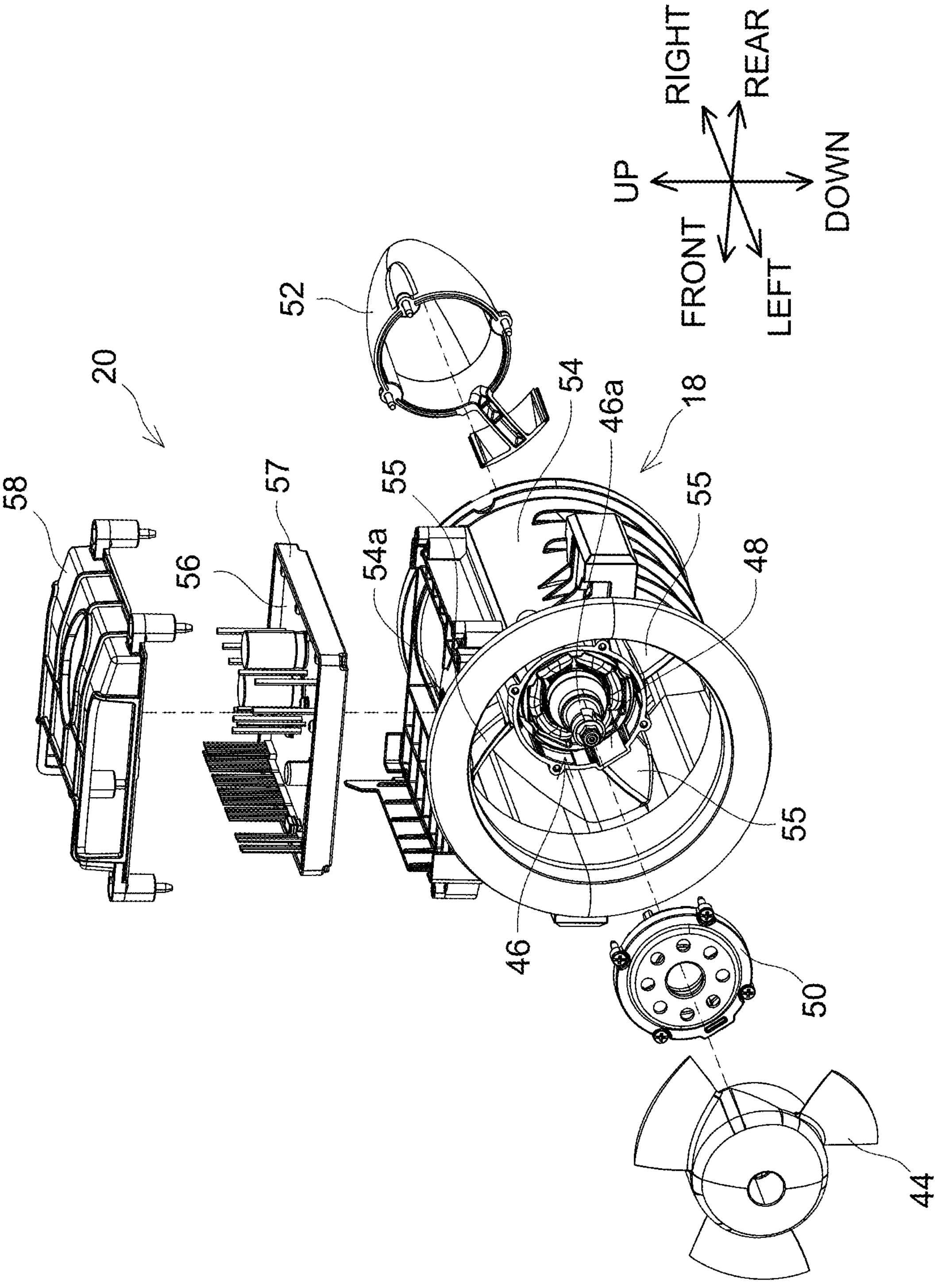
FIG. 4 shows an exploded perspective view a fan unit 18 and a control unit 20 of the first embodiment.

As shown in FIG. 4, the fan unit 18 includes a fan 44, an electric motor 46, a motor housing 48, a lid member 50, a cone 52, and a tubular member 54. The fan 44 is, for example, an axial fan. A shaft 46*a* of the electric motor 46 is connected to the fan 44. The electric motor 46 operates on power from the battery packs BP (see FIG. 2). The electric motor 46 rotates the fan 44. The electric motor 46 is, for example, a brushless motor. The motor housing 48 houses the electric motor 46. A plurality of rectifying fins 55 is formed on the outer surface of the motor housing 48. The lid member 50 closes the left end opening of the motor housing 48. The cone 52 is connected to the right end of motor housing 48. The tubular member 54 has a substantially cylindrical shape. The tubular member 54 houses the fan 44, the electric motor 46, the motor housing 48, and the lid member 50 therein. The inner surface of the tubular member 54 is connected to the plurality of rectifying fins 55. The tubular member 54 is supported by the body housing 16 (see FIG. 2).

The control unit 20 is attached to an upper portion of the tubular member 54. The control unit 20 includes a control board 56 which includes a plurality of switching elements (not shown) and a microcontroller. The control board 56 is configured to control rotation of the electric motor 46. The control board 56 is housed in a case 57. An opening 54*a* is defined in an upper portion of the tubular member 54, and at least a portion of a lower surface of the case 57 blocks the opening 54*a* in the tubular member 54. The case 57 is constituted of, for example, a metallic material. The control unit 20 is covered by a cover member 58. The case 57 and the cover member 58 are attached to the tubular member 54.

The ejection tube 10 shown in FIG. 1 is attached to the tubular member 54. The ejection tube 10 is located on the right side of the body unit 4. The ejection tube 10 includes a curved tube 60 attached to the tubular member 54 (see FIG. 2), a bellows tube 62 attached to the curved tube 60, an intermediate tube 64 attached to the bellows tube 62, and a distal end tube 66 attached to the intermediate tube 64. The bellows tube 62 is configured to adjust an orientation of the intermediate tube 64 and the distal end tube 66. A diffusion cover 70 having a dome shape is attached to the distal end of the distal end tube 66.

As shown in FIG. 1, the handle unit 12 is attached to the intermediate tube 64. The handle unit 12 includes a grip 72, a trigger 74 attached to the grip 72, a head 76 connected to the grip 72, a main power button 78 located on the rear surface of the head 76, and an adjustment button 80 located on the upper surface of the head 76. The user can adjust the orientation of the intermediate tube 64 and the distal end tube 66 by gripping the grip 72 and moving the handle unit 12. The main power button 78 accepts operation by the user to switch on and off a state of the working machine 2. The adjustment button 80 accepts operation by the user to adjust a rotation speed of the electric motor 46 (see FIG. 4).

When the trigger 74 is pulled by the user when the working machine 2 is in an on-state, the control board 56 shown in FIG. 4 rotates the shaft 46*a* of the electric motor 46 using power from the battery pack BP (see FIG. 2). Consequently, the fan 44 rotates and air flows into the first internal space 32 (see FIG. 2) from outside the working machine 2 through the plurality of intake openings 40*a* (see FIG. 3). The air that has flowed in flows into the interior of the tubular member 54. As shown in FIG. 4, the air that has flowed in is delivered by the fan 44, rectified by the plurality of rectifying fins 55, and flows along the cone 52. Since at least a part of the lower surface of the case 57 blocks the opening 54*a* in the tubular member 54, the air delivered by the fan 44 flows along the lower surface of the case 57. Consequently, the case 57 is cooled, as a result of which the control unit 20 (control board 56) is cooled. The air then flows inside the ejection tube 10 shown in FIG. 5, passes through the diffusion cover 70, and is ejected to the outside of the working machine 2. The air is guided radially outward from the distal end tube 66 by the diffusion fins 70*a* of the diffusion cover 70 and is ejected over a wide area.

As shown in FIG. 3, the liquid tank 24 is mounted on the top of the body housing 16. The liquid tank 24 stores liquid. The liquid is, for example, a chemical solution or water.

As shown in FIG. 6, a discharge part 84 and a supply part 86 are formed at the lower end of the liquid tank 24. A discharge tube 88 is connected to the discharge part 84. By the user opening a discharge cock 89 on the discharge tube 88, the liquid stored in the liquid tank 24 is discharged through the discharge part 84 and the discharge tube 88 to the outside of the liquid tank 24.

A supply line 90 is connected to the supply part 86. The supply line 90 includes a first supply tube 92, a first supply cock 94, a solenoid valve 96, a supply tube 98, a second supply cock 100 (see FIG. 5), a second supply tube 102 (see FIG. 5), and a third supply cock 104 (see FIG. 5). When work is performed using the working machine 2, the first supply cock 94, the second supply cock 100, and the third supply cock 104 are open. As shown in FIG. 6, the first supply tube 92 is connected to the supply part 86 of the liquid tank 24. The first supply cock 94 and solenoid valve 96 are located on the first supply tube 92. The first supply cock 94 is operated by the user. The first supply cock 94 opens and closes the first supply tube 92. Although not shown, the solenoid valve 96 is located inside the body housing 16 (see FIG. 2). The solenoid valve 96 opens and closes under the control of the control board 56 (see FIG. 4).

Figure 5:
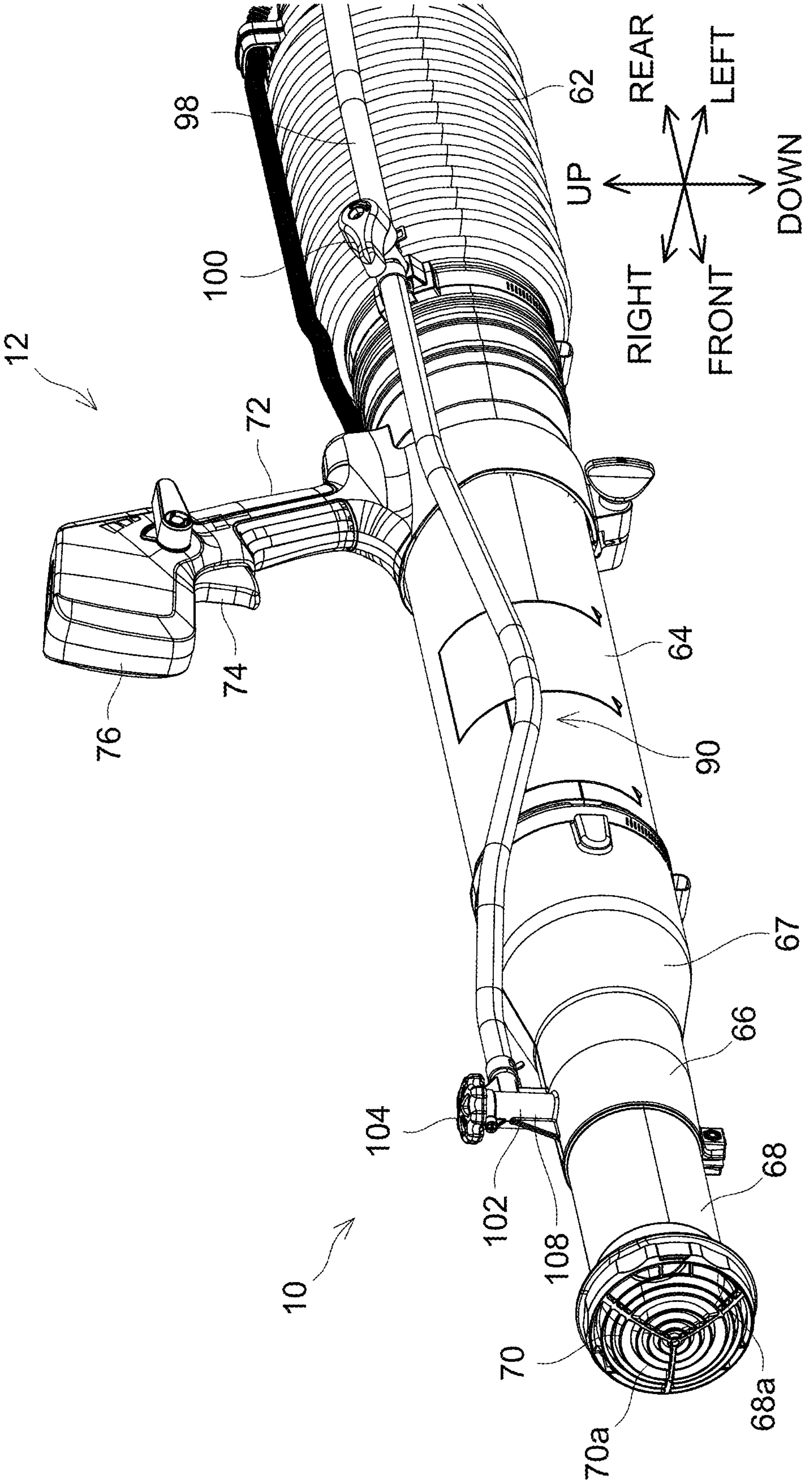
FIG. 5 shows a perspective view of an ejection tube 10 of the first embodiment.

The supply tube 98 is connected to the first supply tube 92. As shown in FIG. 5, the supply tube 98 extends along the ejection tube 10. The second supply cock 100 is located on the supply tube 98. The supply tube 98 is fixed to the ejection tube 10 at a position where the second supply cock 100 is arranged. The second supply cock 100 is operated by the user. The second supply cock 100 opens and closes the supply tube 98.

As shown in FIG. 7, the second supply tube 102 is connected to the supply tube 98. The distal end tube 66 has a first distal end tube 67 and a second distal end tube 68 attached to the front end of the first distal end tube 67, and the second supply tube 102 is integrated with the first distal end tube 67. The second supply tube 102 includes an outer portion 108, a first inner portion 110, and a second inner portion 112. The outer portion 108 is located outside of the distal end tube 66. The third supply cock 104 is disposed on the outer portion 108. The third supply cock 104 is operated by the user. The third supply cock 104 opens and closes the outer portion 108. The first inner portion 110 and the second inner portion 112 are disposed inside the distal end tube 66. The first inner portion 110 extends downward from the lower end of the outer portion 108. The second inner portion 112 extends from the lower end of the first inner portion 110 toward the ejection opening 68*a* of the second distal end tube 68. When the first supply cock 94 (see FIG. 6), the solenoid valve 96 (see FIG. 6), the second supply cock 100 (see FIG. 5), and the third supply cock 104 are open, the liquid in the liquid tank 24 (see FIG. 5) can flow inside the first supply tube 92 (see FIG. 5), the supply tube 98, and the second supply tube 102.

In the following, the case where the longitudinal direction of the distal end tube 66 is along the front-rear direction will be described as an example. The working machine 2 further includes a tubular member 120 and a liquid nozzle 122. The tubular member 120 is disposed inside the second distal end tube 68. The tubular member 120 has a substantially cylindrical shape having its longitudinal direction in the front-rear direction. The tubular member 120 has a front tubular portion 124 and a rear tubular portion 126. The front tubular portion 124 is connected to the second distal end tube 68 via a plurality of fins 128. The front tubular portion 124, the plurality of fins 128, and the second distal end tube 68 are integrated. The rear tubular portion 126 is located rearward of the front tubular portion 124. The rear tubular portion 126 is connected to the fin 128 and the second distal end tube 68 by screws. The diameter of the inner surface of the tubular member 120 decreases toward the front and then increases. A portion of the air flowing inside the distal end tube 66 flows through the interior of the tubular member 120, as shown by an arrow F1 in FIG. 7, and the remainder of the air flowing inside the distal end tube 66 flows outside the tubular member 120, as shown by an arrow F2 in FIG. 7.

The liquid nozzle 122 is, for example, an Ultra Low Volume nozzle. The liquid nozzle 122 is positioned inside the second distal end tube 68. The front end of the liquid nozzle 122 is positioned closest (frontmost) to the ejection opening **68*a* of the second distal end tube 68, and the rear end of the liquid nozzle 122 is positioned farthest (rearmost) from the ejection opening 68*a* of the second distal end tube 68. The front end of the liquid nozzle 122 corresponds to the distal end of the liquid nozzle 122, and the rear end of the liquid nozzle 122 corresponds to the base end of the liquid nozzle 122. The liquid nozzle 122 has its longitudinal direction in the front-rear direction. The liquid nozzle 122 is constituted of a metallic material, e.g., brass. In a variant, the liquid nozzle 122** may be constituted of a resin material.

As shown in FIG. 8, the liquid nozzle 122 includes a liquid nozzle body 132, a facing body 134, and a connecting body 136. The liquid nozzle body 132 includes an insertion part 140 and a nozzle part 142. The insertion part 140 has a substantially cylindrical shape. As shown in FIG. 9, an elastic member 144 is attached to the outer surface of the insertion part 140. The elastic member 144 is, for example, an O-ring. An external thread 146 is formed on the outer surface of the insertion part 140. An internal thread 148 is formed on the inner surface of the second inner portion 112. The insertion part 140 is inserted into the inner surface of the second inner portion 112 and the external thread 146 of the insertion part 140 is screwed into the internal thread 148 of the second inner portion 112, by which the insertion part 140 is connected to the second inner portion 112. When the insertion part 140 is connected to the second inner portion 112, the elastic member 144 is held between the outer surface of the insertion part 140 and the inner surface of the second inner portion 112. Consequently, a space between the outer surface of the insertion part 140 and the inner surface of the second inner portion 112 is sealed.

The nozzle part 142 is connected to the front end of the insertion part 140. The nozzle part 142 includes a nozzle side surface 150. The nozzle side surface 150 constitutes at least a part of the external shape of the nozzle part 142. As shown in FIG. 7, a part of the air flowing inside the distal end tube 66 flows along the nozzle side surface 150 toward the front end of the liquid nozzle 122, as indicated by the arrow F1. The nozzle side surface 150 includes a first nozzle side surface 152 and a second nozzle side surface 154. The diameter of the rear end of the first nozzle side surface 152 is substantially identical to the diameter of the outer surface of the second inner portion 112. The diameter of the first nozzle side surface 152 decreases from the rear end to the front end of the nozzle part 142. The first nozzle side surface 152 has a smooth curved shape. The second nozzle side surface 154 is located frontward of the first nozzle side surface 152. The diameter of the second nozzle side surface 154 is substantially identical to the diameter of the front end of the first nozzle side surface 152 and is constant in the front and rear direction. The second nozzle side surface 154 and at least a part of the first nozzle side surface 152 are surrounded by the rear tubular portion 126.

As shown in FIG. 9, the liquid nozzle 122 further includes a liquid passage 158. The liquid passage 158 is located inside the insertion part 140 and the nozzle part 142. The liquid passage 158 extends from the rear end to the front end of the liquid nozzle 122. The liquid passage 158 is disposed on a central axis CX of the liquid nozzle 122. The central axis CX extends in the front-rear direction (the longitudinal direction of the liquid nozzle 122). The cross-section of the liquid passage 158 has a substantially circular shape.

The liquid passage 158 includes an inlet passage 160, a first transition passage 162, a constricted passage 164, a second transition passage 166, and an outlet passage 168. The inlet passage 160 is in communication with the internal space of the second inner portion 112. A diameter of the inlet passage 160 is, for example, 5 mm. The inlet passage 160 extends forward from the rear end of the insertion part 140. The inlet passage 160 is defined over the insertion part 140 and the nozzle part 142.

As shown in FIG. 10, the first transition passage 162 is connected to the front end (distal end) of the inlet passage 160. The diameter of the first transition passage 162 gradually decreases toward the front. The constricted passage 164 is connected to the front end of the first transition passage 162. The diameter D1 of the constricted passage 164 is smaller than the diameter of the inlet passage 160. The diameter D1 of the constricted passage 164 is, for example, 0.5 mm. The front end of the constricted passage 164 corresponds to the ejection hole 170. The ejection hole 170 is located on the central axis CX. The second transition passage 166 is connected to the front end of the constricted passage 164. The diameter of the second transition passage 166 gradually increases toward the front. The outlet passage 168 is connected to the front end of the second transition passage 166. The diameter of the outlet passage 168 is substantially identical to the diameter of the inlet passage 160. The outlet passage 168 extends to a front end surface **132*a* of the liquid nozzle body 132. The front end surface 132*a* corresponds to the distal end surface of the liquid nozzle body 132**.

The facing body 134 is positioned frontward of the front end surface **132*a* of the liquid nozzle body 132. The facing body 134 is away from the front end surface 132*a* of the liquid nozzle body 132. As a result, a space 174 is defined between the facing body 134 and the front end surface 132*a* of the liquid nozzle body 132. The facing body 134 has, as a whole, a substantially disc shape. The facing body 134 includes a press-in receiving body 176 having a substantially cylindrical shape and a press-in body 178 having a substantially disc shape. The press-in body 178 is press-fitted into the press-in receiving body 176. When the press-in body 178 is press-fitted into the press-in receiving body 176, the diameter of the press-in body 178 is approximately the same as the diameter of the outlet passage 168**.

The facing body 134 includes a facing surface 180, a facing body side surface 182, and a facing body front end surface 184. The facing surface 180 faces the ejection hole 170 of the liquid nozzle body 132. The facing surface 180 is away from the front end surface **132*a* of the liquid nozzle body 132. The distance L1 between the facing surface 180 and the front end surface 132*a* is equal to or more than 200% and equal to or less than 600% of the diameter D1 of the constricted passage 164, which in this embodiment is set to equal to or more than 300% and equal to or less than 500% of the diameter D1. The facing surface 180 has a substantially circular shape. The circular center of the facing surface 180** is located on the central axis CX.

The facing body side surface 182 corresponds to the side surface of the facing body 134. The facing body side surface 182 is connected to the facing surface 180. The facing body side surface 182 is substantially orthogonal to the facing surface 180. The cross-section of the facing body side surface 182 has a substantially circular shape. The diameter of the facing body side surface 182 is substantially the same as the diameter of the facing surface 180. The diameter of the facing body side surface 182 is equal to or more than 60% and equal to or less than 100% of the diameter of the front end of the second nozzle side surface 154 (the diameter of the front end surface 132*a* of the liquid nozzle body 132). In the present embodiment, the diameter of the facing body side surface 182 is 100% of the diameter of the front end of the second nozzle side surface 154. The diameter of the facing body side surface 182 is constant in the front-rear direction.

The facing body front end surface 184 corresponds to the distal end surface of the facing body 134. The facing body front end surface 184 is substantially orthogonal to the facing body side surface 182. The facing body front end surface 184 is a surface opposite the facing surface 180.

The facing body 134 further includes a corner part 188. As shown in FIG. 11, the corner part 188 connects the facing body side surface 182 to the facing body front end surface 184. FIG. 11 is an enlarged cross-sectional view of the corner part 188 and shows the corner part 188 with emphasis. The corner part 188 runs around the central axis CX (see FIG. 10). That is, the corner part 188 is disposed over an entire periphery of the front end of the facing body side surface 182. The corner part 188 constitutes a corner of the front end (distal end) of the facing body 134. A radius of curvature of the corner part 188 is, for example, 0.3 mm or less. The corner part 188 is a sharp corner. The corner part 188 has a curved surface shape. In a variation, the corner part 188 may not have a curved surface shape. The corner part 188 is connected to the facing body side surface 182 at a side surface connecting point 190 and connected to the facing body front end surface 184 at a front end connection point 192. At the vicinity of the corner part 188, a virtual side surface 194 defined by extending the facing body side surface 182 and a virtual front end surface 196 defined by extending the facing body front end surface 184 intersect at a substantially right angle at a first point 198. The distance L2 between the first point 198 and the side surface connecting point 190 is, for example, 0.3 mm or less. The distance L3 between the first point 198 and the front end connection point 192 is, for example, 0.3 mm or less. The distance L3 is substantially the same as the distance L2. In a variant, the distance L3 may be different from the distance L2.

As shown in FIG. 10, the connecting body 136 connects the front end surface 132*a* of the liquid nozzle body 132 to the facing surface 180 of the facing body 134. The liquid nozzle body 132, the press-in receiving body 176 of the facing body 134, and the connecting body 136 are integrally formed. As shown in FIG. 12, the connecting body 136 includes a first connecting body 200 and a second connecting body 202. The first connecting body 200 and the second connecting body 202 are arranged around the central axis CX. The first connecting body 200 and the second connecting body 202 are disposed apart from each other in the circumferential direction of the central axis CX. Thus, with respect to the circumferential direction of the central axis CX, a first opening 204 is defined between one end of the first connecting body 200 and one end of the second connecting body 202, and a second opening 206 is defined between the other end of the first connecting body 200 and the other end of the second connecting body 202. With respect to the circumferential direction of the central axis CX, when the position of the first connecting body 200 is defined as 0 degrees, the second connecting body 202 is at a position of 180 degrees. An inner surface 200*a* of the first connecting body 200 faces an inner surface 202*a* of the second connecting body 202. The outer surface 200*b* of the first connecting body 200 is connected to the facing body side surface 182 of the facing body 134 and the second nozzle side surface 154 (see FIG. 10) of the liquid nozzle body 132. The outer surface 200*b* is a surface opposite the inner surface 200*a*. The distance between the outer surface 200*b* and the central axis CX is approximately the same as the radius of the front end of the second nozzle side surface 154 and the radius of the facing body side surface 182. An outer surface 202*b* of the second connecting body 202 is connected to the facing body side surface 182 of the facing body 134 and the second nozzle side surface 154 of the liquid nozzle body 132. The outer surface 202*b* is a surface opposite the inner surface 202*a*. The distance between the outer surface 202*b* and the central axis CX is approximately the same as the radius of the front end of the second nozzle side surface 154 and the radius of the facing body side surface 182.

With respect to the circumferential direction of the central axis CX, a length L4 of the outer surface 200*b* of the first connecting body 200 is equal to or less than 25% of the circumferential length of the facing body side surface 182. In the present embodiment, the length L4 is equal to or less than 15% of the circumferential length of the facing body side surface 182. With respect to the circumferential direction of the central axis CX, a length L5 of the outer surface 202*b* of the second connecting body 202 is equal to or less than 25% of the circumferential length of the facing body side surface 182, and in the present embodiment, the length L5 is equal to or less than 15% of the circumferential length of the facing body side surface 182. That is, with respect to the circumferential direction of the central axis CX, the total length of the length L4 and the length L5 is equal to or less than 50% of the circumferential length of the facing body side surface 182, and in the present embodiment, it is equal to or less than 30% of the circumferential length of the facing body side surface 182. Further, with respect to the circumferential direction of the central axis CX, the length L4 is substantially identical to the length L5. With respect to the circumferential direction of the central axis CX, the length L4 is substantially identical to the length of the inner surface 200*a* of the first connecting body 200. With respect to the circumferential direction of the central axis CX, the length L5 is substantially identical to the length of the inner surface 202*a* of the second connecting body 202.

Next, a manufacturing method of the liquid nozzle 122 will be described. The manufacturing method includes a press-in process and an opening defining process. The press-in process and the opening defining process are executed in this order. As shown in FIG. 13, two components, a base body 210 and a press-in body 178, are prepared as starting components. The base body 210 includes the liquid passage 158, and the liquid passage 158 penetrates through the base body 210 in the front-rear direction. Although not shown, the insertion part 140 is formed near the rear end of the base body 210.

In the press-in process, the press-in body 178 is press-fitted into the outlet passage 168 of the liquid passage 158 from the front side of the base body 210 in the direction of an arrow shown in FIG. 13. As shown in FIG. 14, the press-in body 178 is press-fitted into the outlet passage 168 until the position of the front end of the press-in body 178 comes to the approximately same position as the front end of the base body 210. As a result, the outlet passage 168 is closed by the press-in body 178 at the vicinity of the front end.

In the opening defining process, a first cutting blade 220 is positioned above the base body 210 and a second cutting blade 222 is positioned below the base body 210. When the position of the first cutting blade 220 is defined as 0 degrees with respect to the circumferential direction of the central axis CX, the second cutting blade 222 is at a position of 180 degrees. Next, the first cutting blade 220 and the second cutting blade 222 are arranged between the press-in body 178 and the constricted passage 164 with respect to the front-rear direction. Next, the first cutting blade 220 is moved downward (in the direction of the downward arrow shown in FIG. 14) from the side surface 212 of the base body 210 toward the central axis CX to reach a predetermined position, and the second cutting blade 222 is moved upward (in the direction of the upward arrow shown in FIG. 14) from the side surface 212 of the base body 210 toward the central axis CX to reach the specified position. The first cutting blade 220 cuts the base body 210 to define the first opening 204 (see FIG. 12) in the base body 210. The first opening 204 penetrates the base body 210 from the side surface 212 of the base body 210 to the inner surface 214. The second cutting blade 222 cuts the base body 210 to define the second opening 206 (see FIG. 12) in the base body 210. The second opening 206 penetrates the base body 210 from the side surface 212 of the base body 210 to the inner surface 214. With respect to the circumferential direction of the central axis CX, when the position of the first opening 204 is defined as 0 degrees, the second opening 206 is at a position of 180 degrees.

As shown in FIG. 10, the base body 210 after the opening defining process includes the liquid nozzle body 132 positioned rearward of the first opening 204 and the second opening 206, the press-in receiving body 176 of the facing body 134 positioned frontward of the first opening 204 and the second opening 206, and the connecting body 136 positioned between the liquid nozzle body 132 and the press-in receiving body 176.

Next, how the liquid ejected from the liquid nozzle 122 is atomized will be explained. As shown in FIG. 7, when the fan 44 (see FIG. 4) rotates due to the rotation of the electric motor 46 (see FIG. 4), air flows into ejection tube 10. The air flows through the ejection tube 10 to the distal end tube 66, flows into the interior of the tubular member 120 as shown by the arrow F1 in FIG. 7, and flows along the nozzle side surface 150 of the liquid nozzle body 132 toward the front end (distal end) of the liquid nozzle 122. Further, since the first nozzle side surface 152 of the liquid nozzle body 132 is surrounded by the tubular member 120 and the diameter of the first nozzle side surface 152 decreases from the rear end to the front end of the nozzle part 142, this structure facilitates the air to flow into the interior of the tubular member 120 and reduces the space in which air flows (space around the first nozzle side surface 152), by which the speed of the airflow increases. The air flows through the first nozzle side surface 152, the second nozzle side surface 154, and the facing body side surface 182 of the facing body 134 in this order and flows through the interior of the tubular member 120 from the rear end to the front end of the tubular member 120.

Here, as shown in FIG. 10, in a comparative example where the distance L1 between the facing surface 180 and the front end surface 132*a* is greater than 600% of the diameter D1 of the constricted passage 164, a part of the air may flow into the space 174 after flowing along the second nozzle side surface 154. This decreases the speed of the air flowing along the facing body side surface 182. On the other hand, in the present embodiment, since the distance L1 is less than 600% of the diameter D1, air is suppressed from flowing into the space 174 after flowing along the second nozzle side surface 154. This can suppress the decrease in the speed of the air flowing along the facing body side surface 182. Further, since the air passes through the second nozzle side surface 154 and the facing body side surface 182, the air in the space 174 is suctioned out of the space 174 through the first opening 204 and the second opening 206.

Further, as the air flows around the liquid nozzle 122, a pressure differential is created between an area near the facing body side surface 182 and an area frontward of the facing body front end surface 184, as a result of which an airflow (spiral flow) SW1 is generated in the area frontward of the facing body front end surface 184. The airflow SW1 first flows along the central axis CX toward the facing body front end surface 184. Next, the airflow SW1 turns in a direction away from the central axis CX and flows on the facing body front end surface 184 toward the corner part 188. Finally, the airflow SW1 merges with the airflow flowing along the facing body side surface 182 at the vicinity of the corner part 188.

As the air in the space 174 is suctioned out of the space 174, the liquid is ejected from the ejection hole 170 after passing through the supply line 90 (see FIG. 6), the inlet passage 160, the first transition passage 162, and the constricted passage 164 in this order. The ejected liquid passes through the second transition passage 166 and the outlet passage 168 in this order and is injected into the space 174 toward the facing surface 180 (press-in body 178) of the facing body 134. After the liquid collides on the facing surface 180 (press-in body 178), the liquid flows on the facing surface 180 outwardly in a radial direction of the facing surface 180 toward the facing body side surface 182. As the liquid collides on the facing surface 180, the speed of the liquid is reduced. When the liquid flows to a connection point between the facing surface 180 and the facing body side surface 182, the liquid flows onto the facing body side surface 182.

Here, in the comparative example where the distance L1 between the facing surface 180 and the front end surface 132*a* is smaller than 200% of the diameter D1 of the constricted passage 164, air in the space 174 is suppressed from being suctioned out of the space 174 through the first opening 204 and the second opening 206. Due to this, the liquid may accumulate between the facing surface 180 and the front end surface 132*a*. On the other hand, in the present embodiment, since the distance L1 is equal to or more than 200% of the diameter D1, the air in the space 174 is suctioned out of the space 174 through the first and second openings 204 and 206. Consequently, accumulation of the liquid between the facing surface 180 and the front end surface 132*a* is suppressed. As a result, the liquid can flow from the facing surface 180 onto the facing body side surface 182.

Then, the liquid flows on the facing body side surface 182 toward the corner part 188 (see FIG. 10) due to the airflow along the facing body side surface 182. The liquid spreads over the entire circumference of the facing body side surface 182 as it flows on the facing body side surface 182.

Since the corner part 188 is a sharp corner, the liquid that flowed to the corner part 188 tend not to create a liquid puddle on the corner part 188. Therefore, the liquid separates off of the corner part 188 due to the airflow along the facing body side surface 182 and the airflow SW1 without creating a liquid puddle. Consequently, the liquid is atomized. The liquid is atomized so that its diameter becomes, for example, equal to or smaller than 50 micrometers.

In the working machine 2 of the present embodiment, the electric motor 46 is used. The airflow rate of the fan 44 of the electric-motor-driven (electric) working machine 2 is lower than that of the fan 44 of an engine-driven working machine. Even in this configuration, the liquid can be atomized by using the liquid nozzle 122 of the present embodiment.

As shown in FIG. 7, the atomized liquid flows inside the distal end tube 66 with the air flowing inside the tubular member 120 indicated by the arrow F1. The liquid and air flowing inside the tubular member 120 then merge with the air flowing outside the tubular member 120 indicated by the arrow F2, and are injected (sprayed) from the diffusion cover 70 into the outside of the second distal end tube 68.

Effects

The working machine 2 of the present embodiment is a mist blower. The working machine 2 comprises: the liquid tank 24 configured to store the liquid; the fan 44; the ejection tube 10 through which the air delivered by the fan 44 flows; the liquid nozzle body 132 disposed inside the ejection tube 10 and configured to inject the liquid stored in the liquid tank 24 into the ejection tube 10; and the facing body 134 being away from the liquid nozzle body 132. The liquid nozzle body 132 comprises: the liquid passage 158 through which the liquid flows and which comprises the constricted passage 164 (an example of a constricted part) having the minimum diameter D1; and the nozzle side surface 150 along which the air delivered by the fan 44 flows. The liquid is ejected from the ejection hole 170 of the constricted passage 164. The facing body 134 comprises: the facing surface 180 that faces the ejection hole 170; and the facing body side surface 182 connected to the facing surface 180 and along which the air delivered by the fan 44 flows.

According to the above configuration, the liquid ejected from the ejection hole 170 collides on the facing surface 180 of the facing body 134 and flows on the facing surface 180 to the facing body side surface 182. The liquid then separates off of the facing body 134 by the air delivered by the fan 44. Consequently, the liquid can be atomized.

The liquid nozzle 122 of the present embodiment is configured to inject a liquid stored in the liquid tank 24 into the ejection tube 10 through which air flows. The liquid nozzle 122 comprises: the base body 210 including the liquid passage 158 (an example of penetrating aperture) which extends in the front-rear direction (an example of first direction) and through which the liquid passes; and the press-in body 178 configured to be pressed in the base body 210. The liquid passage 158 comprises: the constricted passage 164 (an example of constricted part) having the minimum diameter D1 in the liquid passage 158; the inlet passage 160 (an example of first aperture part) having a diameter greater than the diameter D1 of the constricted passage 164; and the outlet passage 168 (an example of second aperture part) disposed opposite to the inlet passage 160 with respect to the constricted passage 164 and having a diameter greater than the diameter D1 of the constricted passage 164. The manufacturing method comprises: press-fitting the press-in body 178 into the outlet passage 168 to a position that is a predetermined distance away from the constricted passage 164; and after the press-fitting, cutting the base body 210 in a direction perpendicular to the front-rear direction (an example of second direction) at a position between the constricted passage 164 and the press-in body 178 to define the openings 204, 206 penetrating the base body 210 from the side surface 212 of the base body 210 to the inner surface 214 of the base body 210.

In the liquid nozzle 122 manufactured by the above manufacturing method, the liquid ejected from the constricted passage 164 collides on the press-in body 178 and flows on the press-in body 178 toward the openings 204 and 206. The liquid then flows to the outside of the liquid nozzle 122 through the openings 204 and 206. The liquid separates off of the liquid nozzle 122 due to the air flowing around the liquid nozzle 122. Consequently, the liquid can be atomized.

The second nozzle side surface 154 of the nozzle side surface 150 has a circular shape. The facing body side surface 182 has a circular shape. The diameter of the facing body side surface 182 is equal to or more than 60% of and equal to or less than 100% of the diameter of the second nozzle side surface 154.

According to the above configuration, even when airflows along the second nozzle side surface 154 of the liquid nozzle body 132 and then flows along the facing body side surface 182 of the facing body 134, the decrease in the speed of the air can be suppressed. Consequently, the liquid can be atomized into finer particles.

The working machine 2 further comprises the connecting body 136 that connects the liquid nozzle body 132 and the facing body 134.

According to the above configuration, the position of the facing body 134 with respect to the liquid nozzle body 132 can be fixed. Accordingly, the liquid can be atomized in a stable manner.

With respect to the circumferential direction of the facing body side surface 182, a total length of the length L4 and the length L5 (a length of the outer surface of the connecting body 136) is equal to or less than 50% of a length of the facing body side surface 182.

The above configuration allows the liquid to flow over the entire circumference of the facing body side surface 182. Consequently, the liquid can be atomized into finer particles.

The distance L1 between the facing surface 180 and the liquid nozzle body 132 is equal to or more than 200% of the diameter D1 of the constricted passage 164 and equal to or less than 600% of the diameter D1 of the constricted passage 164.

When the distance L1 between the facing surface 180 and the liquid nozzle body 132 is smaller than 200% of the diameter D1 of the constricted passage 164, the liquid ejected from the ejection hole 170 accumulates between the liquid nozzle body 132 and the facing body 134, by which atomization of the liquid is suppressed. On the other hand, when the distance L1 between the facing surface 180 and the liquid nozzle body 132 is greater than 600% of the diameter D1 of the constricted passage 164, the airflow speed of the air flowing along the facing body side surface 182 of the facing body 134 is decreased as compared to a configuration in which the distance L1 between the facing surface 180 and the liquid nozzle body 132 is equal to or less than 600% of the diameter D1 of the constricted passage 164. As a result, atomization of the liquid is suppressed. According to the above configuration, the liquid can be atomized.

Second Embodiment

A second embodiment will be described with reference to FIG. 15. In the second embodiment, only the points that differ from the first embodiment will be described. In the second embodiment, the liquid nozzle body 132 and the connecting body 136 are separate members. In FIG. 15, a boundary 300 between the liquid nozzle body 132 and the connecting body 136 is illustrated by a one-dot-chain line. The connecting body 136 includes a protrusion 302 protruding from the rear end surface. The liquid nozzle body 132 includes a recessed groove 304 recessed from the front end surface 132*a*. In FIG. 15, the protrusion 302 and the recessed groove 304 are shown by a one-dot-line because the protrusion 302 and the recessed groove 304 are hidden and not visible. The protrusion 302 mates with the recessed groove 304. Consequently, the liquid nozzle body 132 and the connecting body 136 are connected.

Effects

The connecting body 136 is integrated with the facing body 134 and is a separate member from the liquid nozzle body 132.

According to the above configuration, the liquid nozzle body 132, the facing body 134, and the connecting body 136 can be easily manufactured.

Third Embodiment

A third embodiment will be described with reference to FIG. 16. In the third embodiment, only the points that differ from the first embodiment will be described. In the third embodiment, the connecting body 136 has a cylindrical shape. The connecting body 136 includes a plurality of (in the present embodiment, four) openings 350. The openings 350 penetrate the connecting body 136 from the inner surface to the outer surface. The four openings 350 are equally spaced with respect to the circumferential direction of the outer surface of the connecting body 136. The openings 350 have a substantially cylindrical shape. In the third embodiment, the liquid is ejected from the ejection hole 170 of the liquid nozzle body 132, and after hitting the facing surface 180 of the facing body 134, the liquid flows to the facing body side surface 182 through the openings 350.

Fourth Example

A fourth embodiment will be described with reference to FIG. 17. In the fourth embodiment, only the points that differ from the first embodiment will be described. In the fourth embodiment, the facing body front end surface 184 of the facing body 134 includes a first front end surface 400 and a second front end surface 402. The first front end surface 400 has a substantially circular shape. The circular center of the first front end surface 400 is positioned on the central axis CX. The first front end surface 400 is substantially orthogonal to the central axis CX. The second front end surface 402 is arranged at the periphery of the first front end surface 400. The second front end surface 402 extends around the central axis CX. The second front end surface 402 is inclined with respect to the first front end surface 400. The second front end surface 402 is inclined with respect to the facing body side surface 182. An angle A between the second front end surface 402 and the facing body side surface 182 is greater than 1 degree and less than 180 degrees, and in the present embodiment, the angle A is greater than 1 degree and equal to or less than 90 degrees.

Fifth Embodiment

A fifth embodiment will be described with reference to FIG. 18. In the fifth embodiment, only the points that differ from the first embodiment will be described. In the fifth embodiment, the corner part 188 may include a first curved surface portion 450, a second curved surface portion 452, and a flat surface portion 454. The first curved surface portion 450 is connected to the facing body side surface 182 at the side surface connecting point 190. The second curved surface portion 452 is connected to the facing body front end surface 184 at the front end connection point 192. The first curved surface portion 450 and the second curved surface portion 452 have a curved surface shape. The flat surface portion 454 connects the first curved surface portion 450 and the second curved surface portion 452. The flat surface portion 454 has a planar shape.

VARIANT

The working machine 2 of one embodiment may be an engine-driven working machine.

The working machine 2 of one embodiment may be a working machine including a built-in battery. In this case, the built-in battery is charged by connecting a power cable to an external power source. The working machine 2 may not include a built-in battery. In this case, the working machine 2 operates on electric power supplied from an external power source via the power cable.

The working machine 2 of one embodiment is not limited to a backpack working machine, but may be a surface-mounting working machine, or may be a hand-held working machine, for example.

In one embodiment of the liquid nozzle 122, the corner part 188 may be arranged only on a part of the periphery of the facing body side surface 182 in the circumferential direction.

In the liquid nozzle 122 of one embodiment, the cross-section of the facing body side surface 182 may be polygonal, e.g., hexagonal, octagonal, decagonal, or dodecagonal.

In the liquid nozzle 122 of one embodiment, the liquid nozzle body 132, the facing body 134, and the connecting body 136 may be integrated.

The liquid nozzle 122 of one embodiment may not include the connecting body 136. In this case, the facing body 134 is fixed to the tubular member 120.

What is claimed is:

1. A mist blower comprising:

a liquid tank configured to store a liquid;

a fan;

an ejection tube through which air delivered by the fan flows;

a liquid nozzle body disposed inside the ejection tube and configured to inject the liquid stored in the liquid tank into the ejection tube;

a facing body positioned with respect to the liquid nozzle body such that a space is defined between the liquid nozzle body and the facing body;

a connecting body that connects the liquid nozzle body and the facing body, wherein the liquid nozzle body comprises:

a liquid passage through which the liquid flows and which comprises a constricted part having a diameter that is a minimum diameter among a plurality of diameters of the liquid passage; and a nozzle side surface along which the air delivered by the fan flows, the liquid is ejected from an ejection hole of the constricted part, the facing body comprises:

a facing surface that faces the ejection hole; and a facing body side surface connected to the facing surface and along which the air delivered by the fan flows, and an entirety of the connecting body is disposed in the space between the liquid nozzle body and the facing body.

2. The mist blower according to claim 1, wherein the nozzle side surface has a circular shape having a first diameter, the facing body side surface has a circular shape having a second diameter, and the second diameter is equal to or more than 60% of the first diameter and equal to or less than 100% of the first diameter.

3. The mist blower according to claim 2, wherein when the mist blower is cut in a plane perpendicular to a direction in which the liquid passage extends, a length of a periphery of a cross section of the connecting body is equal to or less than 50% of a length of a periphery of a cross section of the facing body side surface, the connecting body is integrated with the facing body and is a separate member from the liquid nozzle body, and a distance between the facing body and the liquid nozzle body is equal to or more than 200% of the diameter of the constricted part and equal to or less than 600% of the diameter of the constricted part.

4. The mist blower according to claim 1, wherein when the mist blower is cut in a plane perpendicular to a direction in which the liquid passage extends, a length of a periphery of a cross section of the connecting body is equal to or less than 50% of a length of a periphery of a cross section of the facing body side surface.

5. The mist blower according to claim 1, wherein the connecting body is integrated with the facing body and is a separate member from the liquid nozzle body.

6. The mist blower according to claim 1, wherein a distance between the facing surface and the liquid nozzle body is equal to or more than 200% of the diameter of the constricted part and equal to or less than 600% of the diameter of the constricted part.

7. The mist blower according to claim 1, wherein a center of the liquid passage and a center of the facing surface are disposed on a central axis, the connecting body connects a distal end surface of the liquid nozzle body and the facing surface of the facing body, and a distance between an outer surface of the connecting body and the central axis is equal to a radius of a distal end of the nozzle side surface and a radius of the facing body side surface.

* * * * *